(12) United States Patent
Li et al.

(10) Patent No.: US 10,652,784 B2
(45) Date of Patent: May 12, 2020

(54) METHOD AND APPARATUS FOR SERVING MOBILE COMMUNICATION DEVICES USING TUNNELING PROTOCOLS

(71) Applicants: Xu Li, Nepean (CA); Ngoc Dung Dao, Ottawa (CA); Aaron James Callard, Ottawa (CA); Hang Zhang, Nepean (CA)

(72) Inventors: Xu Li, Nepean (CA); Ngoc Dung Dao, Ottawa (CA); Aaron James Callard, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/718,823

(22) Filed: Sep. 28, 2017

(65) Prior Publication Data

US 2018/0098251 A1   Apr. 5, 2018

Related U.S. Application Data

(60) Provisional application No. 62/455,385, filed on Feb. 6, 2017, provisional application No. 62/447,755, filed on Jan. 18, 2017, provisional application No. 62/442,855, filed on Jan. 5, 2017, provisional application No. 62/402,712, filed on Sep. 30, 2016.

(51) Int. Cl.
*H04W 36/00* (2009.01)
*H04W 36/32* (2009.01)

(52) U.S. Cl.
CPC .... *H04W 36/0016* (2013.01); *H04W 36/0061* (2013.01); *H04W 36/32* (2013.01)

(58) Field of Classification Search
None
See application file for complete search history.

(56) References Cited

U.S. PATENT DOCUMENTS

| | | | |
|---|---|---|---|
| 8,838,103 B2* | 9/2014 | Lee | H04W 36/0016 370/331 |
| 2005/0083887 A1 | 4/2005 | Lee et al. | |
| 2007/0160049 A1 | 7/2007 | Xie et al. | |
| 2010/0254347 A1* | 10/2010 | Muhanna | H04W 36/0016 370/331 |
| 2015/0036663 A1 | 2/2015 | Kilpatrick, II et al. | |
| 2017/0289270 A1* | 10/2017 | Li | H04L 41/0803 370/328 |

(Continued)

FOREIGN PATENT DOCUMENTS

| | | |
|---|---|---|
| CN | 1652630 A | 8/2005 |
| CN | 101345987 A | 1/2009 |

(Continued)

OTHER PUBLICATIONS

International Search Report dated Dec. 28, 2017 for corresponding International Application No. PCT/CN2017/104552 filed Sep. 29, 2017.
3GPP TR 23.799 and entitled "Study on Architecture for Next Generation System," version 0.8.0, Sep. 2016.
3GPP TR 25.912, Feasibility study for evolved Universal Terrestrial Radio Access (UTRA) and Universal Terrestrial Radio Access Network (UTRAN), Dec. 2015.

*Primary Examiner* — Anh Vu H Ly

(57) ABSTRACT

A method and apparatus for supporting node-level tunneling for mobile user equipment (UE) in a wireless communication network such as a 5th generation network.

8 Claims, 27 Drawing Sheets

(56) References Cited

U.S. PATENT DOCUMENTS

| | | | |
|---|---|---|---|
| 2017/0317894 A1* | 11/2017 | Dao | H04W 28/24 370/328 |
| 2017/0322421 A1* | 11/2017 | Hunter | G02B 27/017 370/328 |
| 2017/0339609 A1* | 11/2017 | Youn | H04W 76/11 370/328 |
| 2017/0374586 A1* | 12/2017 | Condeixa | H04W 36/0055 370/328 |
| 2018/0041984 A1* | 2/2018 | Li | H04W 8/08 370/328 |
| 2018/0063701 A1* | 3/2018 | Jin | H04W 8/22 370/328 |
| 2018/0176325 A1* | 6/2018 | Liang | G06F 17/30902 370/328 |
| 2018/0192471 A1* | 7/2018 | Li | H04W 76/12 370/328 |
| 2018/0199398 A1* | 7/2018 | Dao | H04W 36/14 370/328 |
| 2018/0227872 A1* | 8/2018 | Li | H04W 76/20 370/328 |
| 2018/0262924 A1* | 9/2018 | Dao | H04W 24/02 370/328 |

FOREIGN PATENT DOCUMENTS

| | | | |
|---|---|---|---|
| WO | 2014012454 | A1 | 1/2014 |
| WO | 2014089051 | A1 | 6/2014 |

* cited by examiner

METHOD AND APPARATUS FOR SERVING MOBILE COMMUNICATION DEVICES USING TUNNELING PROTOCOLS

CROSS REFERENCE TO RELATED APPLICATIONS

This application is related to the material disclosed in U.S. Provisional Patent Application Ser. No. 62/402,712 filed Sep. 30, 2016, U.S. Provisional Patent Application Ser. No. 62/442,855 filed Jan. 5, 2017, U.S. Provisional Patent Application Ser. No. 62/447,755 filed Jan. 18, 2017, and U.S. Provisional Patent Application Ser. No. 62/455,385 filed Feb. 6, 2017 the contents of each of which are incorporated herein by reference.

FIELD

The present invention pertains to the field of wireless communication networks and in particular to a method and apparatus for serving mobile wireless communication devices using node-level and session-level tunneling protocols.

BACKGROUND

The 3$^{rd}$ Generation Partnership Project (3GPP) technical report numbered TR 23.799 and entitled "Study on Architecture for Next Generation System," version 0.8.0, September 2016 (hereinafter referred to as TR 23.799), represents one approach to the design of a system architecture for next generation mobile networks, also referred to as 5$^{th}$ generation (5G) networks. Section 6.4 of this document considers potential solutions to the key issue of session management in such networks. Subsection 6.4.11 of the same document considers a user plane (UP) protocol model involving per node-level tunneling, proposed as a solution for supporting session management. In particular, a common tunnel is provided for all traffic between each relevant pair of network functions. However, the current proposals are subject to development and improvement. In particular, the current proposal of Subsection 6.4.11 of TR 23.799 is directed toward stationary devices, rather than fixed devices.

Therefore, there is a need for a method and apparatus serving mobile wireless communication devices in wireless communication networks such as proposed 5G networks, in which tunneling protocols, such as per-node level or session-level tunneling are involved, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for efficiently transmitting data in wireless communication networks such as proposed 5G networks, in which per node-level tunneling or per session-level tunneling is involved.

In an implementation, a method is provided for connecting a mobile user equipment (UE) to a network. The method may include a control plane entity available on the network: receiving from an access node a location update for the UE, the location update indicating that the access node is currently serving the UE; and, updating a user plane gateway serving the UE with the location update. In an aspect, the control plane entity may comprise a mobile management entity and a session management entity, the session management entity handling the session connecting the UE to the user plane gateway, and wherein the method further includes the mobile management entity providing the location update to the session management entity, and wherein the user plane gateway is updated by the session management entity.

In an implementation, a method is provided for attaching a user equipment (UE) to a network. The method may include an access node: receiving an attach request from the UE; transmitting the attach request to a control plane entity of the network; receiving a resource request from the control plane entity; providing a resource request response to the control plane entity, the resource request response confirming that the requested resources have been allocated; and, transmitting an attach complete response to the UE. In an aspect, the providing the resource request response to the control plane entity comprises the access node transmitting a resource response request to a user plane entity for the user plane entity to transmit a resource request response to the control plane entity on behalf of the access node. In an aspect, wherein the providing the resource request response to the control plane entity comprises the access node transmitting the resource request response to the control plane entity.

In an implementation, a method is provided for delivering a downlink packet to a user equipment (UE) connected to a network. The method may include a control plane entity of the network: receiving a UE context request from a user plane gateway (UP-GW) seeking to deliver the downlink packet to the UE; the control plane entity identifies an access network node serving the UE; the control plane entity transmits a UE context request response including an indication of a tunnel serving the identified access network node to the UP-GW, the indication of the tunnel to be used by the UP-GW to deliver the downlink packet to the UE. In an aspect, the indication of the tunnel comprises a tunnel ID value.

In an implementation, a method is provided for maintaining a mobile user equipment (UE) connection to a network. The method may include a control plane entity available on the network: receiving a set of potential access nodes that may serve the UE during a future time period; and, preconfiguring each of the potential access nodes to accept a handover from the UE to maintain the connection.

In an implementation, a method is provided for maintaining a connection of a mobile user equipment (UE) to a network, the UE currently connected through a current access node (AN). The method may include a control plane entity available on the network: determining one or more potential ANs, likely to serve the UE based on at least a mobility pattern of the UE; transmitting to each of the one or more potential ANs, UE context information for use in handing over the connection from the current AN to that potential AN; and, transmitting to the current access node an identity of each of the one or more potential ANs.

In an implementation, a method is provided for maintaining a connection of a mobile user equipment (UE) to a network, the UE currently connected through a current access node (AN). The method may include a session management function (SMF) available on the network: receiving identities of one or more potential ANs, likely to serve the UE based on at least a mobility pattern of the UE;

updating each of the one or more potential ANs with UE context information corresponding to the UE and User Plane related connection information; and, configuring corresponding connections of a UP Function for maintaining the connection through each of the one or more potential ANs.

In an embodiment, a method is provided for maintaining a connection of a mobile user equipment (UE) to a network, the method comprising a core network control plane entity available on the network: receiving a set of potential access nodes that are available to serve the UE during a future time period; and, preconfiguring each of the potential access nodes to accept a handover from the UE to maintain the connection.

In an embodiment, a network function of the core network is provided. The network function comprising: a network interface for receiving data from and transmitting data to network functions connected to a network; a processor; and a non-transient memory for storing instructions that when executed by the processor cause the network function to be configured to: receive a set of potential access nodes that are available to serve the UE during a future time period; and, preconfigure each of the potential access nodes to accept a handover from the UE to maintain the connection.

In some implementations, the set of potential access nodes is based on a mobility pattern of the UE.

In some implementations, the preconfiguration is performed by the control entity that determined the set of potential access nodes. In some implementations, the control entity comprises an access and mobility management function (AMF) that maintains the mobility pattern of the UE.

In some implementations, the preconfiguration is performed by the control entity that requests and receives the set of potential access nodes from an access and mobility management function (AMF) maintaining the mobility pattern of the UE.

In some implementations, the preconfiguration comprises transmitting UE context for caching by each of the potential access nodes.

In some implementations, the UE context comprises a pre-allocated non-access stratum (NAS) message for delivery to the UE.

In some implementations, the NAS message is delivered to the UE in response to a session request.

In some implementations, the NAS message is delivered to the UE on handover.

In some implementations, the control entity comprises a session management function (SMF).

In some implementations, the method may further comprise the control plane entity: receiving a handover notification indicating a handover of the UE to one of the preconfigured potential access nodes; and, transmitting to the one of the preconfigured potential access nodes an updated handover target candidacy message indicating handover target candidates for the UE.

BRIEF DESCRIPTION OF THE FIGURES

Further features and advantages of the present invention will become apparent from the following detailed description, taken in combination with the appended drawings, in which:

FIGS. 13A, 13B, 13C, and 34D present signaling diagrams illustrating embodiments of a mobility pattern based connection pre-configuration procedure.

It will be noted that throughout the appended drawings, like features are identified by like reference numerals.

DETAILED DESCRIPTION

Figure 1:
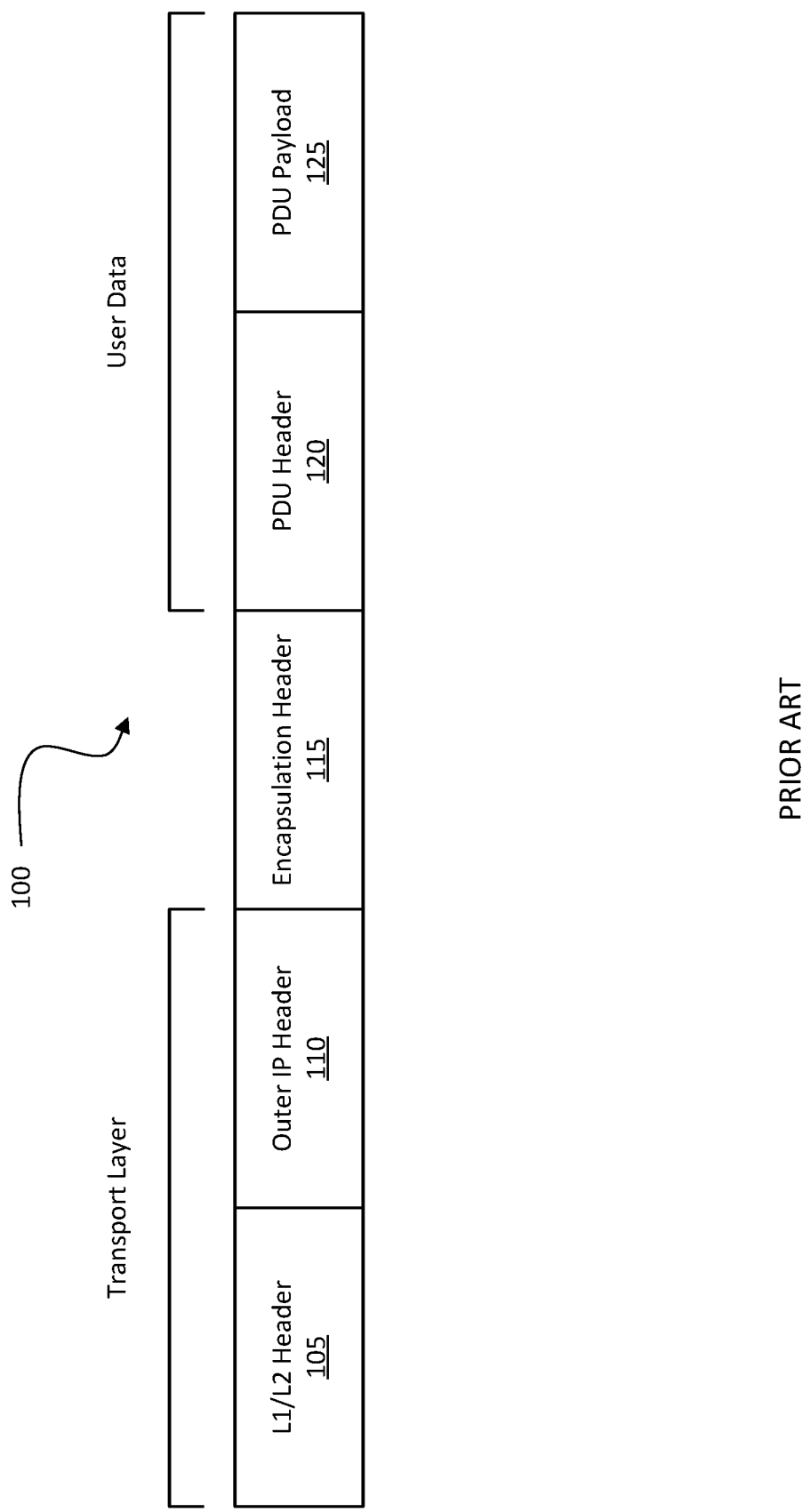
FIG. 1 illustrates a packet structure in accordance with the prior art.

As used herein, the term "User Equipment" (UE) is used for purposes of clarity. However, the UE may refer to one of a variety of devices, generally referred to herein by the term "mobile devices" and including mobile stations, terminals or nodes, fixed or stationary devices, stations, terminals, or nodes, human-type communication devices, machine-type communication (MTC) devices, Internet of Things (IoT) devices, other wireless end nodes, which communicate with a radio access node via wireless communication. One skilled in the art will appreciate that a mobile device is a device designed to connect to a mobile network. This connection typically makes use of a wireless connection to an access node. Although the mobile network is designed to support mobility, it is not necessary that the mobile device itself be mobile. Some mobile devices, such as metering devices (e.g. smart meters) may not be capable of mobility, but still make use of the mobile network.

The present application uses a number of acronyms that are based on current terminology used in the 3GPP standards process. Terms are subject to change as the process progresses, but current terms used by persons of skill in the art include:

AMF—Core Access and Mobility Management Function
AN—Access Node
CP—Control Plane
DL—Downlink
DN—Data Network
EPC—Evolved Packet Core
GUTI—Globally Unique Temporary ID
GW—Gateway
ID—Identifier
IoT—Internet of Things
IMSI—International Mobile Subscriber Identity
LTE—Long Term Evolution
MM—Mobility Management
MP—Mobility Pattern
MTC—Machine-Type Communication
PDU—Protocol Data Unit
QoS—Quality of Service
RAN—Radio Access Network
RA Node—Radio Access Node
SMF—Session Management Function
SSC—Session and Service Continuity
UE—User Equipment
UL—Uplink
UP—User Plane
UPGW—User Plane Gateway
URLLC—Ultra-Reliable Low Latency Communications
VN—Virtual Network The physical network configuration is described by physical nodes, and physical links connecting physical nodes. Each physical node has a number of input and output ports. A physical link connects an output port of a physical node to an input port of another physical node. The physical nodes have at least the following parameters: the number of flows which can be simultaneously supported, the number of input and output ports, the total average bit rate per unit time and the total average packet rate per unit time that can be transferred through physical node, and a geographical location (e.g. a geographical location of the physical node). Each port has at least the following parameters: bit rate per time unit and packet rate per time unit, and the buffer size of the port. The physical links have at least the following parameters: medium type (such as optical cable, microwave), bit rate per time unit, packet rate per time unit, and transmission cost per data unit. Each physical node has an identifier number (ID), for example an IP address. Each port also has a port ID.

The logical network configuration provides an abstraction of a physical network. The logical network is described by logical node and logical links connecting logical nodes. A logical node can reside in a physical network node, or in a data centre, which consists of multiple physical network nodes. A logical node can have a number of ports to connect to other logical node. A logical link connects a port of a logical node to another port of another logical node. A logical link can consist of multiple physical links that provide connections between two physical network nodes hosting logical nodes. Each logical node has at least the following parameters: average bitrate per unit time, average packet rate per unit time, number of flows which can be simultaneously supported, number of input and output ports, and a geographical location for that logical node. Each port has at least the following parameters: bitrate per unit time, packet rate per unit time, and buffer size. The logical links have at least the following parameters: average bitrate per unit time, average packet rate per unit time, number of flows which can be simultaneously supported, and transmission cost per data unit. Each logical node has an identifier number (ID), for example an IP address. Each port also has an identifier (port ID). A logical link can have a single-valued ID, or can be identified by a tuple, for example <source ID, source port ID, destination ID, destination port ID>. The logical link may include one or more tunnels, depending upon the implementation.

The logical node can host certain network functions, such as control functions in the control plane (CP) or packet processing functions for the user plane (UP) in either the core network (CN) or in radio node functions For example, a logical network of a mobile network can be UP functions in a core network and access network (AN) node functions in a radio access network (RAN). The logical links can be set up for UP functions and AN nodes. The logical links can be used to interconnect different UP functions, and to connect the UP functions to the AN nodes.

A physical network can be divided into multiple network slices. Each network slice can be described by a logical network configuration and/or physical network configuration.

The node-level tunnel model is described in TR 23.799. In the existing tunnel model there is a common tunnel for all traffic between each pair of network functions (NFs). For example, common tunnels may be established between a radio access (RA) node and a user plane (UP) function in the core network (CN) or between two UP functions in the CN or between two UP functions in the CN. Further constraints on the common tunnel can be applied by a policy function. For example, the common tunnel can be used for a specific network slice, or a group of users, particular traffic types, or specific services.

Embodiments of the present invention extend existing node-level tunnel solutions to accommodate UEs which exhibit mobility. This may enable "hop-on" network functionality for downlink traffic in the presence of UE mobility. Per-PDU session control overhead and network response delay may also be reduced.

An example scenario involving UE mobility is as follows. A mobile IoT UE, such as a UE incorporated into a vehicle, may initiate a connection to the wireless network. For example, a taxi, a police patrol car, or an ambulance may initiate a communication operation in order to report, via the wireless communication system, its location to an application server for fleet management purposes.

In some embodiments, such mobile UEs are handled similarly to how stationary UEs are handled in TR 23.799, at least in that an aggregate node-level tunnel is provided between the RA node and a relevant UP function. The aggregate node-level tunnel may be used to carry traffic associated multiple UEs, between the RA node and the UP function.

Embodiments of the present invention provide for methods and systems for supporting customer service delivery over a network. Embodiments of the present invention provide a method and apparatus for implementing, in a communication network such as a 5G wireless communication network, data transmission procedures for use with node-level tunnel protocols. This method and system employs network slices to provide UEs connecting to the network with access to the customer services.

The network slice concept has been accepted in wireless telecommunication industry. As used herein, a "slice" is a set of network resources (cloud resources, physical connection resources, wireless spectrum resources, telecommunication equipment resources (access cells), UP paths, tunnels), which has been allocated to a service or a set of services. The created slice can also be referred to as a virtual network (VN), and the terms are used interchangeably herein. A slice may constitute a collection of preconfigured tunnels, a pre-configured end-to-end path, or a collection of pre-configured end-to-end paths, for instance. As used herein, the term "service" is used to refer to an entity that is providing a centralized point to receive or transmit data traffic to connected UEs. By way of example, a business customer may offer delivery of data traffic (such as on-demand video or audio) to subscribing UEs. In operation, a plurality of UEs will seek to connect to the business customer's server(s) to download the data traffic.

This system and method facilitates slice-aware service traffic delivery, or "Hop-On" traffic delivery. In particular, this traffic delivery system and method can be compared to a traveller that hops-on a tourist bus having a pre-defined sightseeing route. The traveller can choose to join or leave the tourist bus without any additional set-up or coordination after the initial access to the bus. In the present VN traffic delivery system and method, access to a service does not require per-UE per-session establishment, and does not require end-to-end connection setup between the UE and the service provider. There is no session setup as the session is effectively "pre-existing" as a VN slice established on the network. The VN slice supported by a pre-defined VN topology configured on the network. The UE only needs to negotiate its entry or exit from the slice which may occur at a localized level. The connection between the slice access point and the service provider is established and maintained by the control functions managing the slice.

Such a hop-on scheme facilitates management of service delivery on a per-service basis over a VN tunnel. All physical network nodes treat all traffic of one service the same and there is no requirement to differentiate between UEs, except in the access link. All per-UE/per-session setup related overhead (remote configuration) and latency is removed and there is no per UE "session connection context" required in the network.

After a UE registers to the network and UP slice(s), the only required UE-specific context required is the UE's location (i.e., a current anchor point of this UE—at a VN node), activity status and registered UP slice(s) which allow Hop-On and access to customer services as and when required.

FIG. 1 illustrates the structure of a packet 100 as described in Section 6.4.11 of TR 23.799. The structure shown in FIG. 1 is illustrative of the use of the one tunnel per destination configuration. The packet 100 includes transport layer headers including an L1/L2 header 105 and an outer IP header 110, and an encapsulation header 115. The outer IP header 110 may be selected based on the peer destination or node. The encapsulation header 115 may not be required for PDU session identification, but may be required to carry QoS marking. The packet 100 includes user data, including a PDU header 120 and a PDU payload 125. The packet 100 of FIG. 1 is presented as an example of some embodiments, and to provide context for the present application. It is not intended to be limiting.

Figure 2:
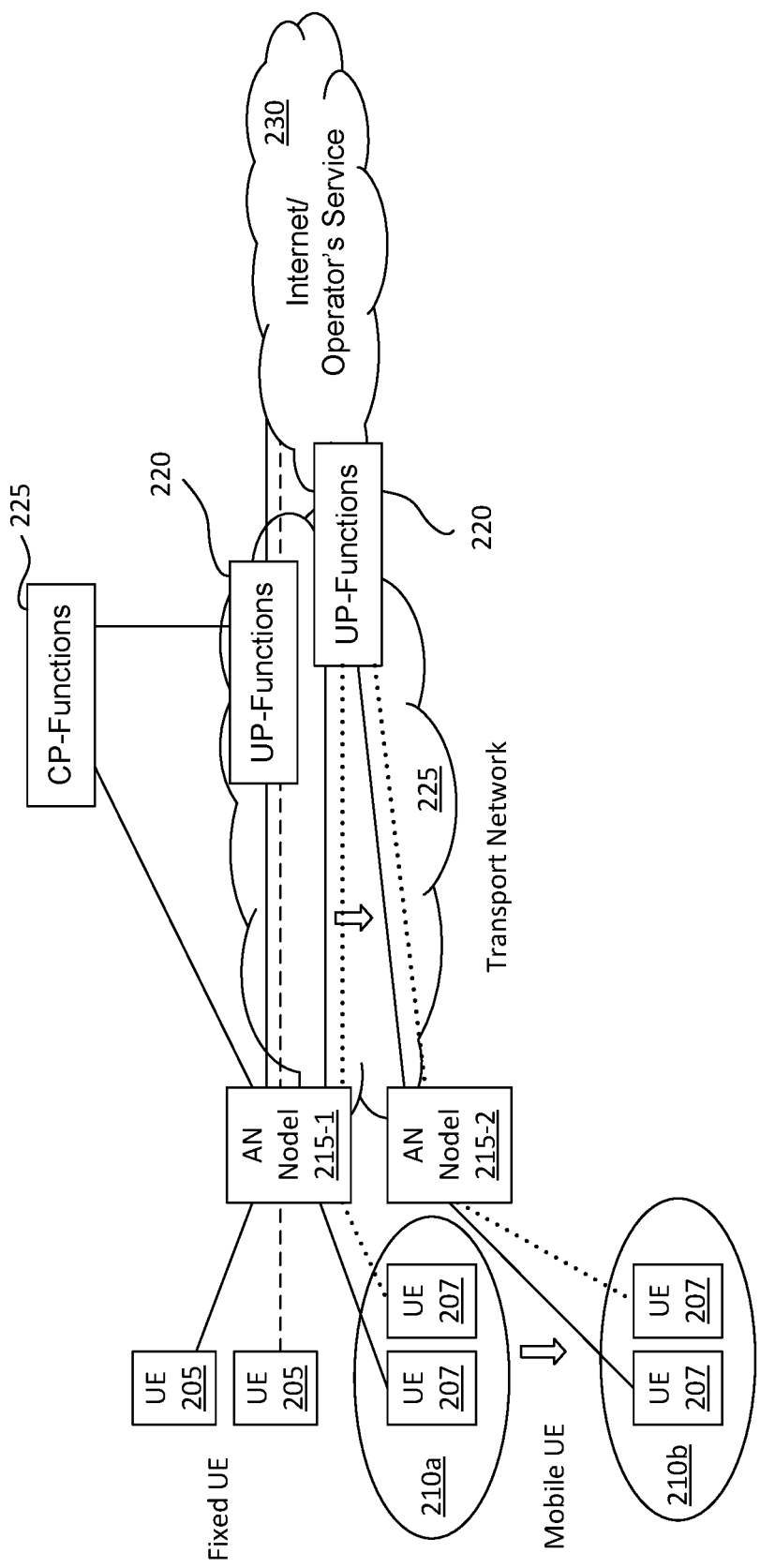
FIG. 2 illustrates a portion of a wireless communication network in which fixed UEs and mobile UEs connect to the network via access network (AN) nodes, in accordance with the prior art.

FIG. 2 illustrates a portion of a wireless communication network in which fixed UEs 205 and mobile UEs 207 connect to the network via AN nodes 215-1 215-2. The mobile UEs are shown in a first location 210a, connected to a first RA node AN 215-1, and a second location 210b, connected to a second RA node AN 215-2. The AN nodes connect to UP functions 220 via a transport network 225. The AN nodes 215-1 215-2 and the UP-Functions 220 are controlled by corresponding control plane (CP) functions 225. When the mobile UE 207 moves from the first location 210a to the second location 210b, the CP functions 225 must be operative to re-direct the UP-functions 220 from the first Node 215-1 to the second AN Node 215-2.

Figure 3A:
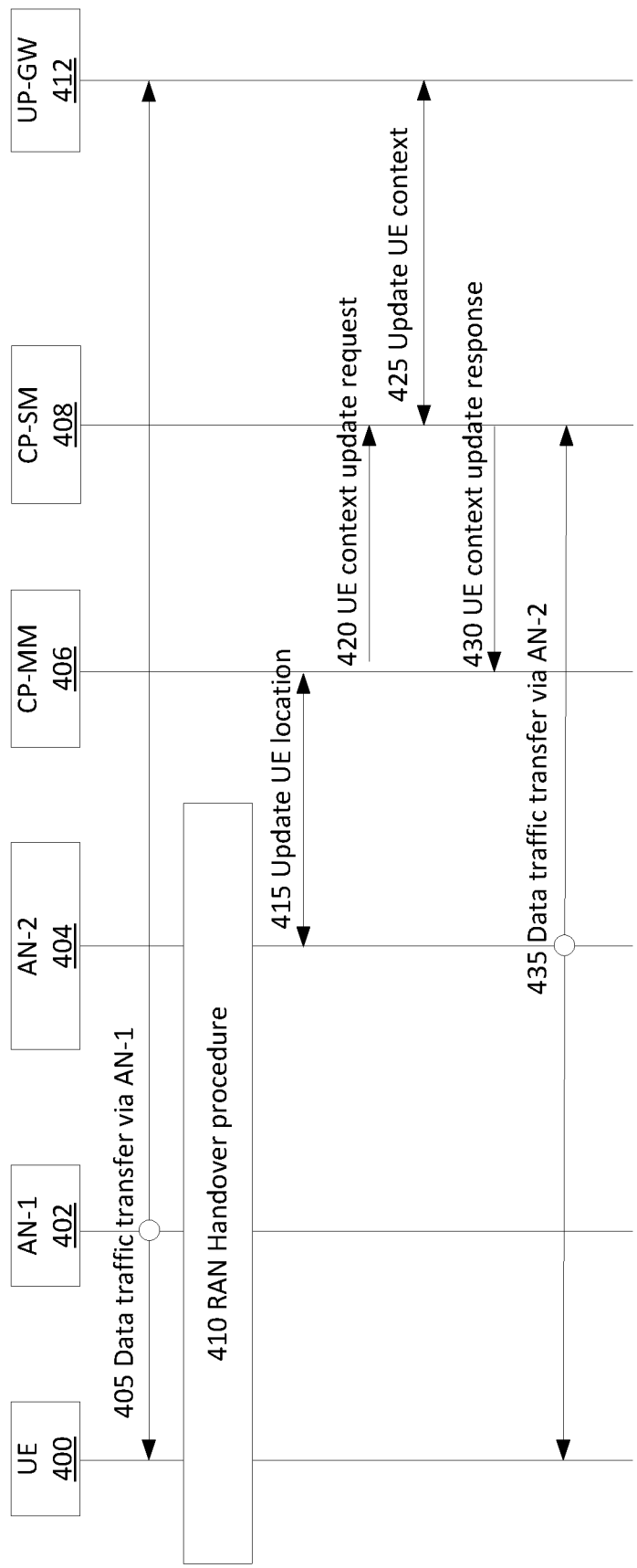
FIG. 3A illustrates a procedure supporting per-node level tunneling for mobile UEs, according to an embodiment of the present invention.

FIG. 3A illustrates a procedure supporting per-node level tunneling for mobile UEs 400, according to an embodiment of the present invention. In the presence of UE mobility, the UE attach procedure is the same as for stationary UEs, as described in TR 23.799. FIG. 3 illustrates the procedure for performing a UE context update at a user plane (UP) gateway (UP-GW) in the network. The performance of the UE context update is triggered by a radio access network (RAN) handover event.

According to FIG. 3A, data traffic is transferred 405 via a first RA node AN-1 402. This scenario presupposes that data traffic to and/or from the UE 400 is already present. The first RA node AN-1 402 messages both the UE 400 and the control plane session manager (CP-SM) 408 regarding the transfer. A handover procedure 410 is then performed, in which the protocol data unit (PDU) session is handed over from the first RA node AN-1 402 to a second RA node AN-2 404. During the handover, the first RA node AN-1 402 is configured to forward any leftover data traffic of the UE 400 to the second RA node AN-2 404. The leftover data traffic corresponds to data packets that have been transmitted to or from the UE 400 but have not yet reached their destination. The second RA node AN-2 404 also maps the UE's traffic to the per node level tunnel to the UP-GW 412. Next, the AN-2 404 transmits a message to the control plane mobility management (CP-MM) function 406 to update 415 the CP-MM 406 with the UE's new location, and to indicate that the second RA node AN-2 402 is currently serving the UE 400. In some implementations, the CP-SM 408 and the CP-MM 406 may comprise a single CP entity. In other implementations, the CP-SM 408 and the CP-MM 406 may comprise separate entities, or functions, with the CP. Furthermore, the specific tasks carried out by each of the CP-MM 406 and the CP-SM 408 are presented here as an example only, and one or the other of the CP-MM 406 and the CP-SM 408 may carry out the tasks depending upon which information is available within a particular implementation.

Next, the CP-MM function 406 transmits a UE context update request message 420 to the CP-SM function 408. The message indicates that the second RA node AN-2 402 is currently serving the UE 400.

The CP-SM 408 function then updates 425 the user plane gateway (UP-GW 412) with the current UE context via a message indicating this updated context. The update indicates the node-level tunnel associated with the second RA node AN-2 402 which is to be used for delivery of downlink (DL) traffic to the UE 400.

The CP-SM function 408 then transmits a UE context update response message 430 to the CP-MM function 406. Following this, data traffic transfer 435 to and/or from the UE 400 via the second RA node AN-2 402 can proceed.

Figure 3B:
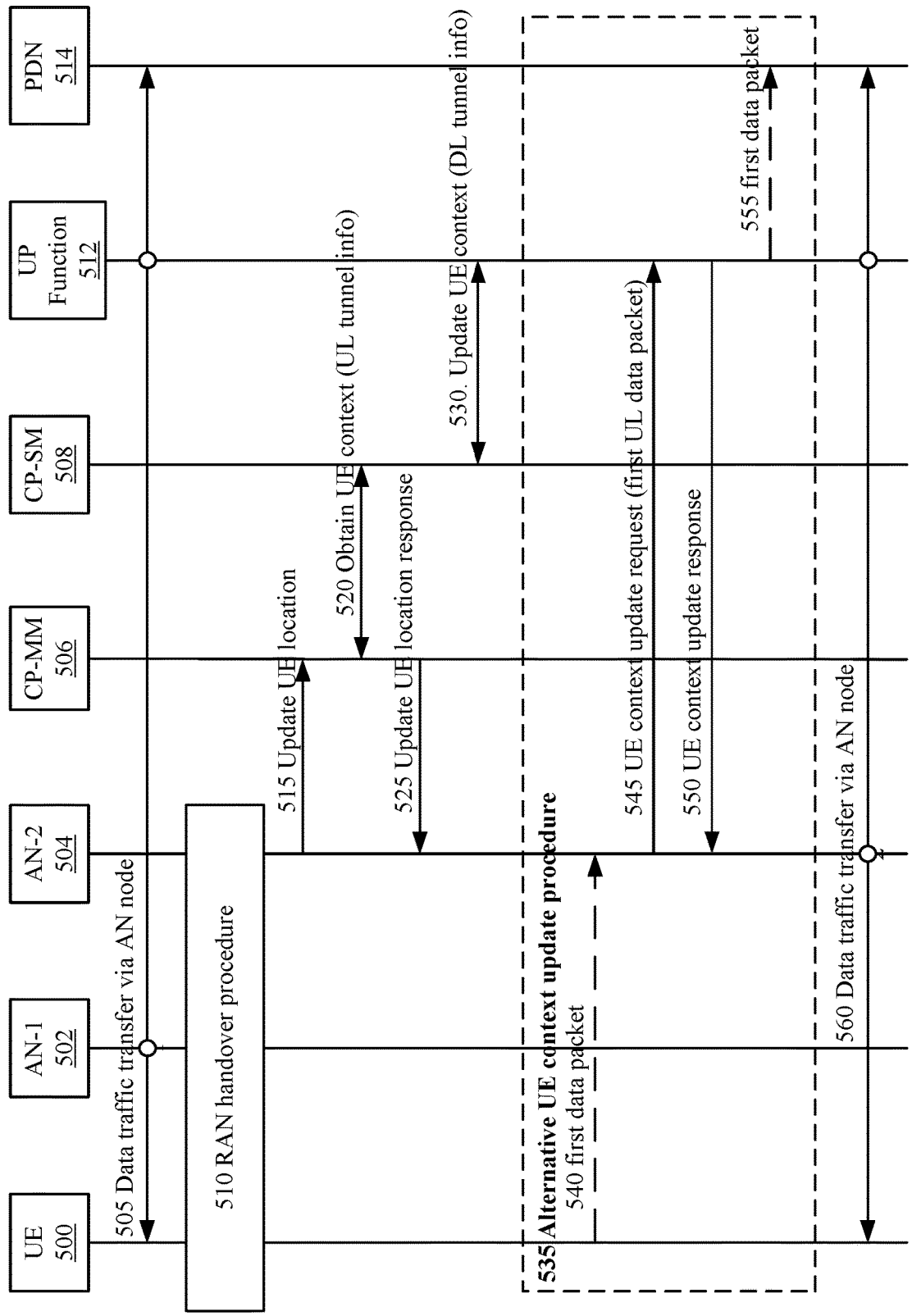
FIG. 3B illustrates an alternate procedure supporting per-node level tunneling for mobile UEs, according to an embodiment of the present invention.

FIG. 3B illustrates an alternate procedure supporting per-node level tunneling for mobile UEs 500, according to an embodiment of the present invention. The per-node level tunnels may be pre-configured when the slice is established, at session establishment, or as required to service the UE 500. In particular FIG. 3B illustrates a procedure for updating UE context at the UP-GW upon handover of the UE 500.

FIG. 3B illustrates two alternative procedures of updating UE context at the UP function 512: a CP-based procedure (Step 530) and a UP based procedure (Step 535), both triggered by RAN handover 510. The CP-based procedure updates UE context at the UP function 512 through a CP-UP signal (i.e. Update UE context step 530), while the UP-based procedure performs the update through a UP message (i.e. UE context update request step 545). The UP-based UE context update procedure 535 avoids signaling between CP-SM 508 and the UP function 512 and thus reduces the handover time, which is important to applications which require low packet delay. The CP-SM 508 determines which procedure should be used according to session QoS requirements (such as the delay budget) and operator policy; in some embodiments, the CP-MM 506 makes such a decision. The decision is informed to the AN node AN-2 504 as part of the original UE context provided to the AN node AN-2 502, for instance, when the session was first established or during the initial attach process. In some embodiments, the decision may be updated and the updated decision may be informed to the AN node AN-2 504 through a separate signaling procedure. In some embodiments, the updated decision may be provided to the RA node AN-2 504 by the CP-MM 506 during the Update UE location response step 525.

In step 505 data traffic is transferred between the UE 500 and the PDN 514 via AN node AN-1. In this embodiment, the data traffic is transferred by the UP Function 512 to the PDN 514. In RAN handover step 510 the PDU session with the UE 400 is handed over to the AN node AN-2 504. The AN node AN-2 504 maps the UE's traffic to the per node level tunnel to the UP function 512. In the event any data traffic is delivered to the AN node AN-1 502 after the handover, the AN node AN-1 502 may, in some embodiments, be configured to forward any leftover UE data traffic to the AN node AN-2 504.

In step 515 the AN node AN-2 504 updates the CP-MM function 506 with the UE location, indicating that RA node AN-2 is currently serving the UE 500. In step 520 the CP-MM function 506 notifies the CP-SM function 502 about the current serving AN of the UE 500, i.e. the AN node AN-2 502, and obtains from the CP-SM function 508 the UE context to be used by the AN node AN-2 502, for instance the UL per-node level tunnel information (i.e. the UP tunnel ID) to be used by the AN node AN-2 504 for the PDU session with the UE 500. In step 525 the CP-MM function 506 sends an update UE location response message to the AN node AN-2 504. The update UE location response message indicates the per-node level tunnel information (including UL tunnel ID as part of the UE context) to be used for the PDU session. The tunnel ID may include, for instance, a single value or a tuple of multiple values such as <source end id, destination end id>, wherein the source/destination end ID may be a single value or a tuple of multiple values such as <node id, port id>.

In step 530 the CP-SM 508 updates the UE context (i.e. the DL per-node level tunnel information, including the DL tunnel ID) with the UP function (e.g. UP GW).

In an alternative procedure to step 530, a CP-based UE context update procedure 535 may be utilised. In step 530, the CP-SM function 508 updates the UP-GW with the latest UE context. The update indicating the AN node level tunnel (i.e. the DL tunnel ID) to be used for DL traffic delivery to the UE 500. In the alternative procedure 535 a UP-based UE context update is employed.

In optional step 540, the UE context update procedure may be triggered upon receipt by the AN node 2 504 of the first UL data packet from the UE 500 after the RAN handover procedure. Alternatively, the UE context update procedure may be triggered by the AN node 2 504 upon receipt of the update UE location response step 525. In some embodiments, the alternative UE context update procedure 535 may be triggered during connection/session setup (i.e. step 510 RAN handover procedure) to reduce network response time during packet delivery.

In step 545 the AN node AN-2 504 sends a UE context update request to the UP function 512 via the AN node AN-2 504 per-node level tunnel. In the embodiment illustrated, where the procedure 535 is triggered by receipt of the first data packet 540, the first UL data packet (if any) piggybacks on the UE context update request message in step 545.

The UP function 512 identifies the per-node level tunnel (i.e. the tunnel ID) indicated by the UE context update request, binds the UE's DL traffic to the per-node level tunnel, and sends a UE context update response to the AN node AN-2 504, step 550, using the identified tunnel.

The UP function extracts the UL data packet piggybacking on the request message (if any) and sends it to the PDN in step 555. In step 560, subsequent data traffic is transferred via the AN node AN-2 504. In this embodiment, the data traffic is transferred by the UP Function 512 to the PDN 514.

Figure 4:
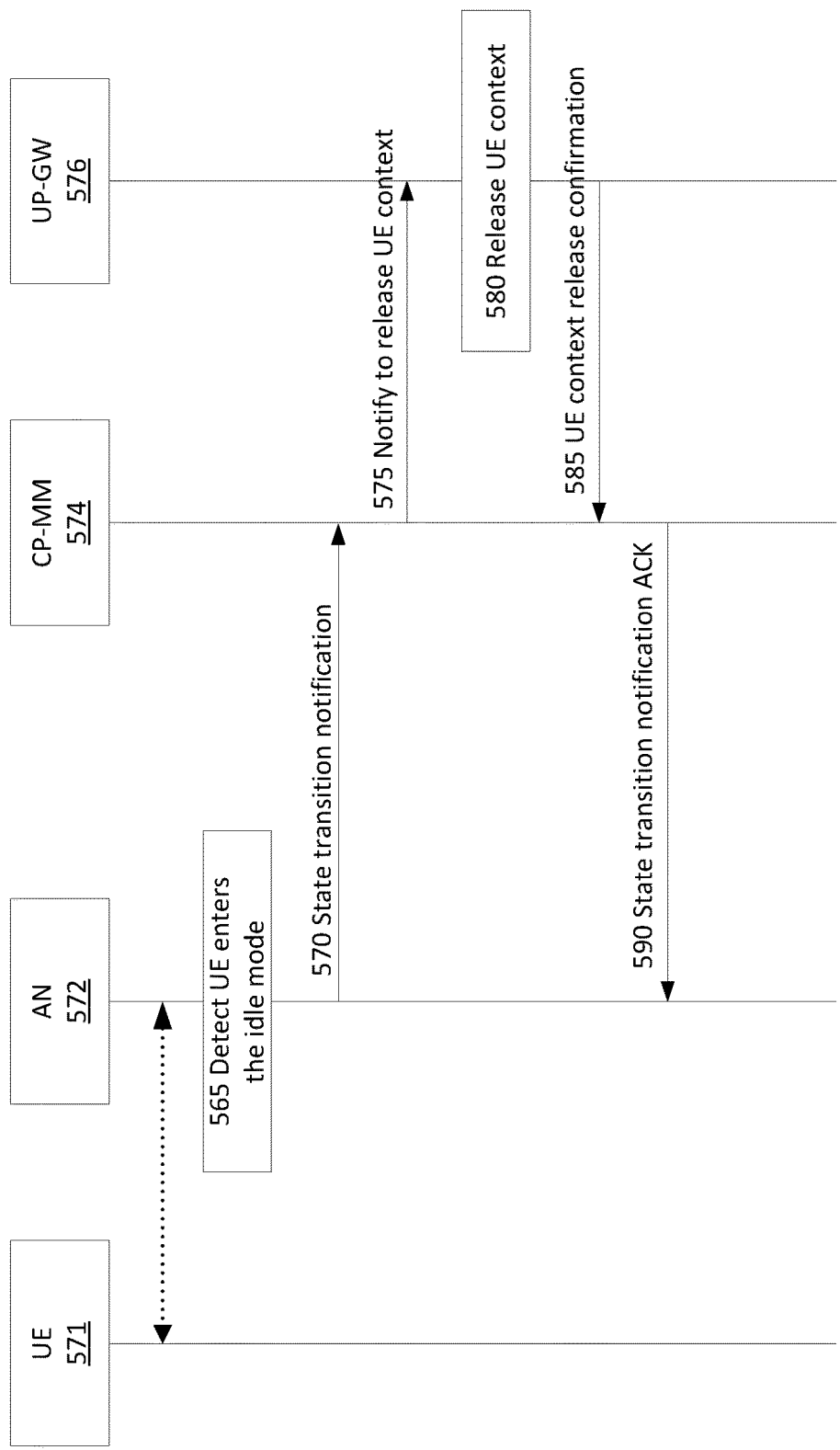
FIG. 4 illustrates a procedure supporting context release for UEs, according to an embodiment of the present invention.

Embodiments of the present invention provide for the release of UE context in response to a transition of the UE to an idle mode. FIG. 4 illustrates a supporting procedure in which a UE's context is released at the UP-GW. The context release is triggered by a state transition of the UE, in which the UE transitions into an idle mode.

As illustrated in FIG. 4, after a period of communication between the AN node 572 and the UE 571, the AN node 572 detects 565 that the UE 571 has entered or is entering an idle mode. In response, the AN node 572 transmits a state transition notification 570 to the CP-MM function 574. The message indicates that the UE 571 is now in the idle mode. The CP-MM function 574 notifies 575 the UP-GW 576 (via a message) to release the current UE context. In response, in step 520 the UP-GW 576 releases (removes) the UE context. In some embodiments this includes removing the knowledge about the current AN node 572 serving the UE 571 from the local repository of the UP-GW 576. The UP-GW 576 then confirms with the CP-MM function 574 that the UE context has been released. In step 590 the CP-MM function 574 transmits an acknowledgement to the AN node 572, the acknowledgment being in response to the state transition notification.

The acknowledgement transmitted in step 590 may be a state transition notification acknowledgement that is the response to the state transition notification received in 570. The AN node 572 detecting that the UE has entered or is entering idle mode may be a result of an explicit receipt of an idle notification message from UE 571. The AN node 572 detecting that the UE has entered or is entering idle mode may be a result of an expiry of a timer (e.g. a timeout condition) maintained by the AN node 572, such as an idle counter or idle timer. The UP-GW 576 may confirm that the UE context has been released by transmitting 585 a UE context release confirmation message to the CP-MM function 574.

Figure 5:
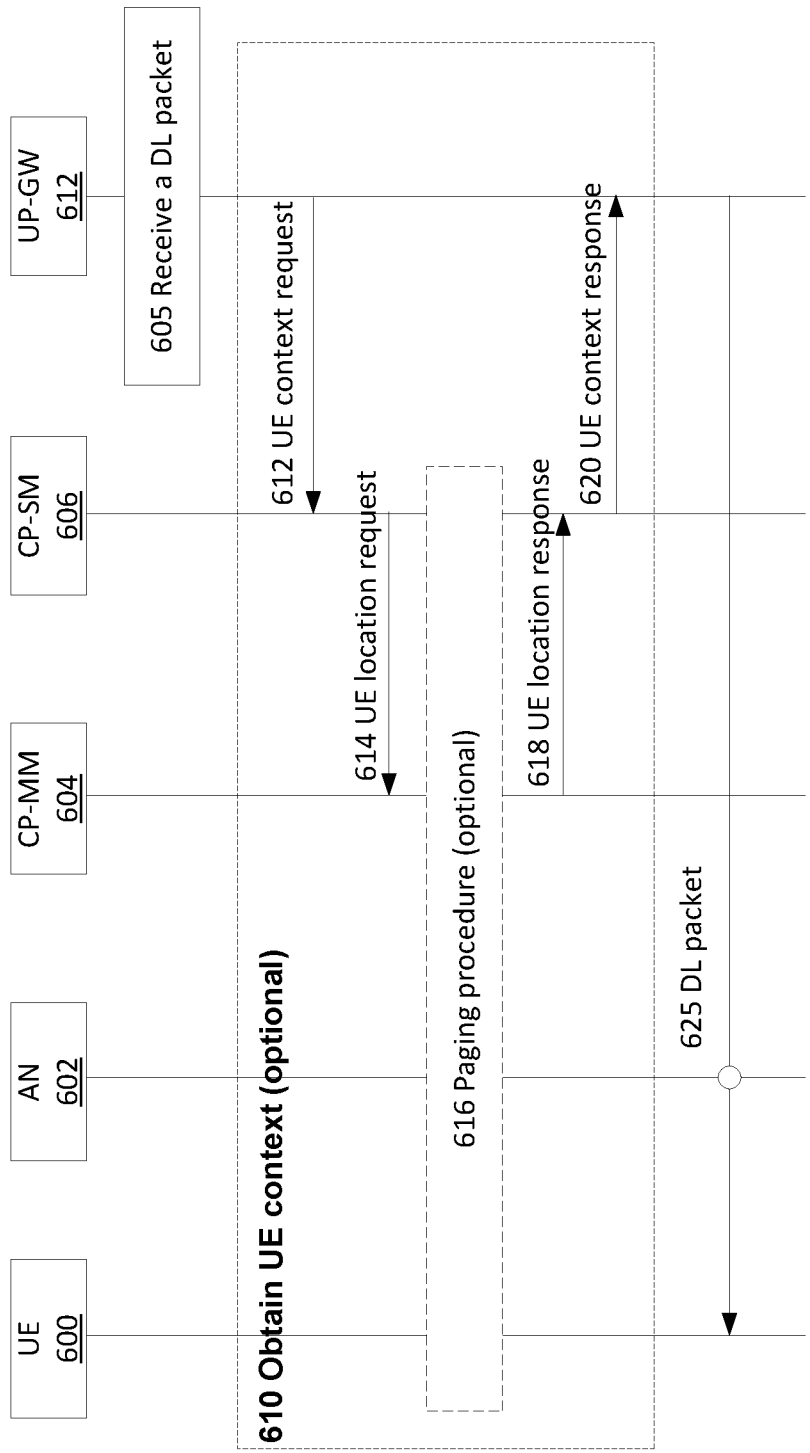
FIG. 5 illustrates a procedure supporting downlink packet delivery to a mobile UE, according to an embodiment of the present invention.

Embodiments of the present invention support downlink packet delivery to mobile UEs via node-level tunneling. FIG. 5 illustrates a supporting procedure for downlink packet delivery to a UE which is attached to the network by an AN node-level tunnel.

As illustrated in FIG. 5, initially the UP-GW 612 receives 605 a DL packet destined for (addressed to) the UE 600. If the UP-GW 612 has a valid context for the UE 600, and no verification is required, the UP-GW 612 may transmit 625 the DL packet to the UE 600 via the AN node 602 using the AN node-level tunnel. Otherwise, the UP-GW 612 obtains 610 the UE context from the control plane (CP) functions.

Obtaining 610 the UE context is described, in an embodiment, as follows. The UP-GW 612 transmits a UE context request message 612 to the CP-SM function 606. The CP-SM function 606 then transmits a UE location request message 614 to the CP-MM function 604. Optionally, the CP-MM function 604 identifies the AN node 602 serving the UE 600 using a paging procedure 616. This paging procedure may or may not be performed if the UE 600 is not in the idle mode. The CP-MM function 604 then transmits a UE location response message 618 to the CP-SM function 606. This UE location response message includes an indication of the AN node 602 serving the UE 600. The CP-SM 606 then identifies the per-node level tunnel of the AN node 602 to be used for DL traffic of the UE 600 and transmits a UE context response message 620 to the UP-GW 612. This message includes an indication of the AN per-node level tunnel (i.e. the tunnel ID) and the traffic handling policy to be used for the UE 600.

After obtaining 610 the UE context, the UP-GW 612 transmits 625 the DL packet to the UE 600 via the AN node 602 using the AN node-level tunnel. The AN node-level tunnel may be selected based on the received UE context response.

An alternative approach for performing setup procedures, according to embodiments of the present invention, is to employ dynamic tunnel binding in which pre-configured tunnels are bound to specific PDU sessions. The dynamic tunnel binding is triggered by transmission of a data packet or a control packet in the user plane, rather than a path setup directed by control plane and user plane control signals. Dynamic tunnel binding operations impact various procedures such as initial attachment, session setup, and handover.

Embodiments of the present invention relate to operations supporting path selection or reselection in which per-node-level tunnel pre-configuration is involved. Three procedures involving path (re)selection are: initial attachment; session setup; and handover. Because of the pre-configuration, path selection in such procedures can be omitted.

Figure 6:
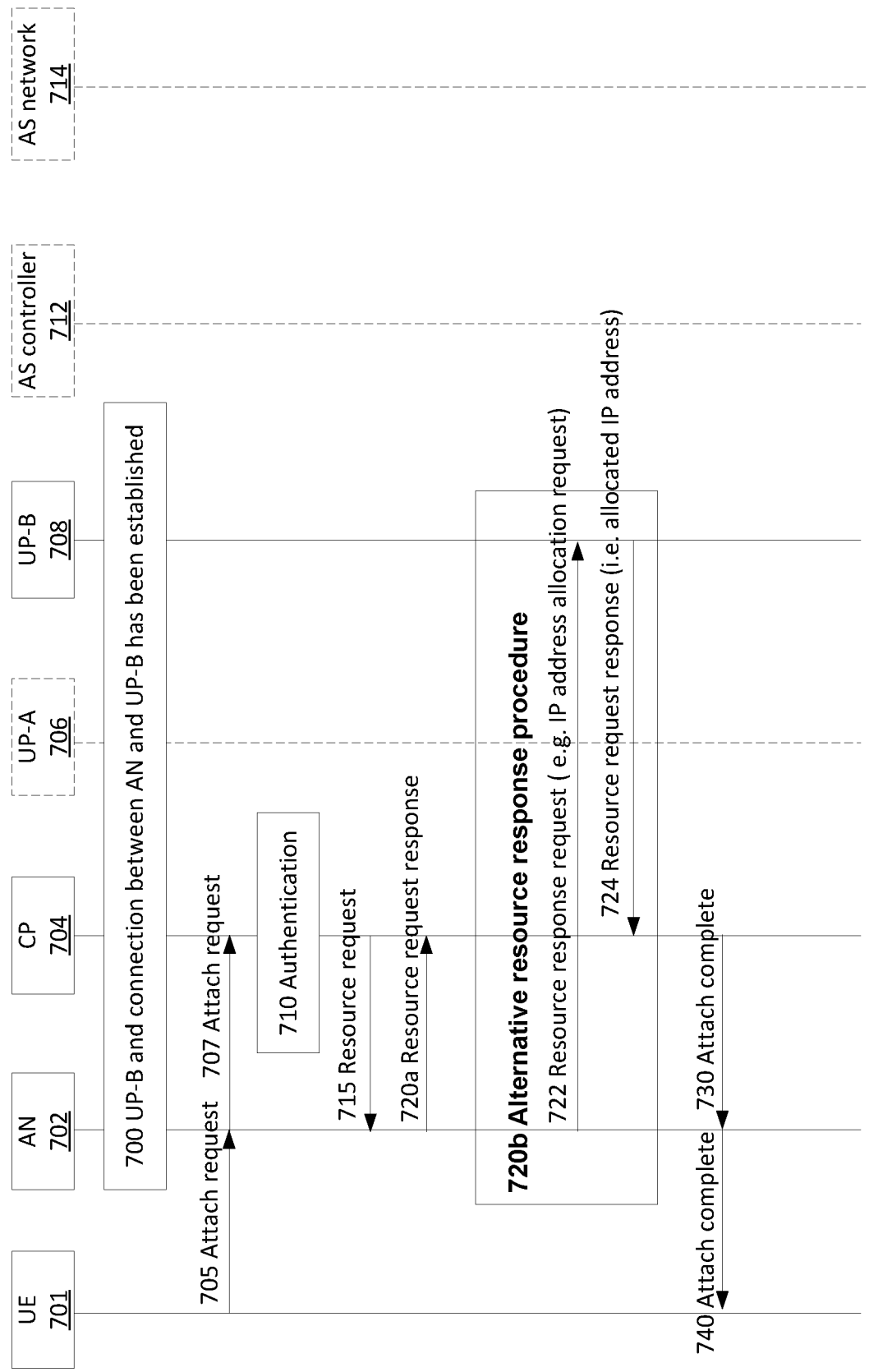
FIG. 6 illustrates an initial attachment procedure involving pre-configured tunnels, according to an embodiment of the present invention.

FIG. 6 illustrates an initial attachment procedure in which pre-configured tunnels are implemented. In this case, the initial attachment procedure does not require the inclusion of path selection.

Having reference to FIG. 6, initially the user plane function UP-B (gateway) 708 and the connection between the AN node 702 and UP-B 708 are already established 700. The UE 701 transmits an initial attach request message 705 to the AN node 702 and the AN node 702 forwards 707 the request to the control plane (CP) 704. The CP 704 then authenticates 710 the attach request. Following successful authentication, the CP 704 requests the AN node 702 to prepare resources via a resource request message 715. The request message indicates a pre-established UP configuration to use (e.g. UP-B 708). The AN node 702 prepares the requested resources, and provides a response to the CP 704 in one of two alternate ways. In a first example, the CP 704 receives a resource request response 720a to the resource request message from the AN node 702. In an alternate embodiment 720b, the CP 704 may receive the resource request response 724 to the resource request from the UP-B 708. In the alternate embodiment 720b, the AN node 702 transmits a resource response request 722 (i.e. an IP address allocation request) to the UP-B 708. The UP-B 708 allocates the requested IP address and transmits the resource request response 724 (in this example the allocated IP address) to the CP 704 on behalf of the AN node 702. Following receipt of the resource request response, the CP 704 transmits an attach complete message 730 to the AN node 702. The attach complete message 730 may include the IP address allocated to the UE 701. The AN node 702 forwards 740 the attach complete message to the UE 701.

Those skilled in the art will appreciate that when referencing signals sent to CP 704, it may be understood that this may be a signal sent to any of a number of different nodes within CP 704, and does not require that the signal or message be sent to all nodes within a control plane. Furthermore, it will be understood that 720a and 720b are intended as alternatives to each other, and that it is not required that both be carried out.

Figure 7:
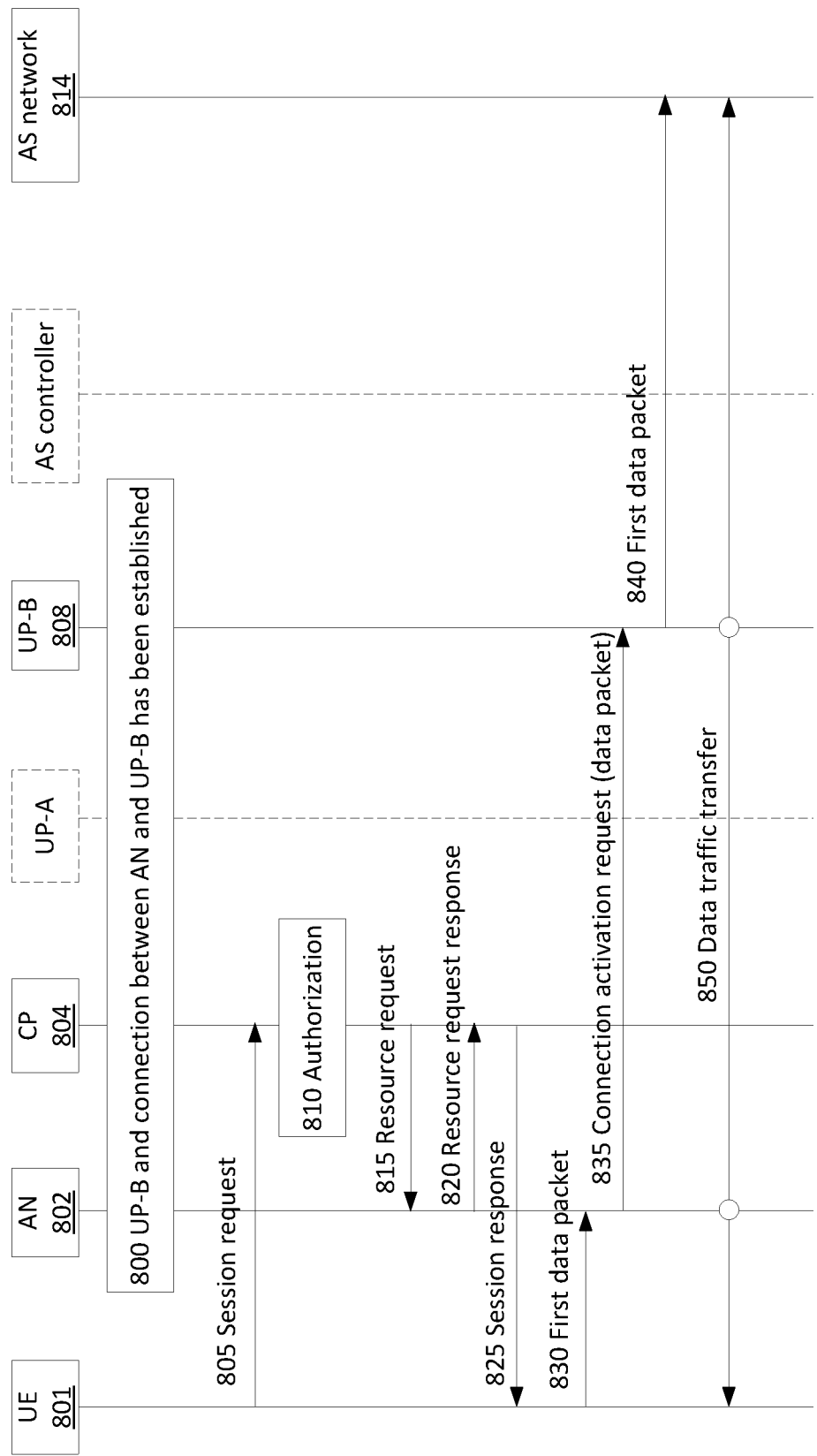
FIG. 7 illustrates a session setup procedure involving pre-configured tunnels, according to an embodiment of the present invention.

FIG. 7 illustrates a session setup procedure in which pre-configured tunnels are implemented. Again, in this case, the session setup procedure does not require the inclusion of path selection. Instead, path selection is triggered by the first data packet and takes place in the form of (dynamic) tunnel binding. In FIG. 7, the session setup procedure and tunnel binding is triggered by a data packet.

Having reference to FIG. 7, initially the user plane function UP-B (gateway) 808 and the connection between the AN node 802 and UP-B 808 are already established 800. The UE 801 sends a PDU session request message 805 to the CP 804. The request message 805 indicates an application with which the PDU session is associated. (It is assumed for the sake of simplifying the explanation that the initial attach procedure has been completed.) The CP 804 then verifies service subscription and authorizes 810 the PDU session. Authorization 810 is optional if the request is pre-authorized during the attach procedure (in which case it may be understood that Authorization 810 has already been performed). Next, the CP 804 requests, via a resource request message 815, the AN node 802 to prepare resources for the PDU session. The AN node 802 accordingly prepares resources for the PDU session, binds the PDU session to the pre-configured AN-UP-B connection, and returns a resource request response 820 to the CP 804. Based on the resource request response 820, the CP 804 then transmits a PDU session response message 825 to the UE 801, indicating the PDU session has been established.

It will be understood that Resource Request Response 820 acts as a confirmation to CP 804 that AN 802 has prepared the requested resources, and that CP 804 transmitting PDU session response message 825 may be contingent upon the resource request response being a positive confirmation that the resources have been prepared.

After receiving the session response message 825, the UE may transmit a first data packet 830 to the AN node 802. The AN node 802 receives the first data packet and AN 802 transmits a connection activation request (a tunnel binding request) 835 to the UP-B gateway. The first data packet may piggyback on the connection activation request. In response to receiving the connection activation request, the UP-B gateway (GW) binds the PDU session to the indicated AN-UP-B connection. The tunnel binding is necessary for delivering downlink traffic associated to the PDU session. The UP identifies the first data packet piggybacking on the tunnel binding request and transmits 840 the first data packet to the application server (AS) network 814. Subsequently, data traffic is transferred 850 through the pre-configured tunnels.

Figure 8:
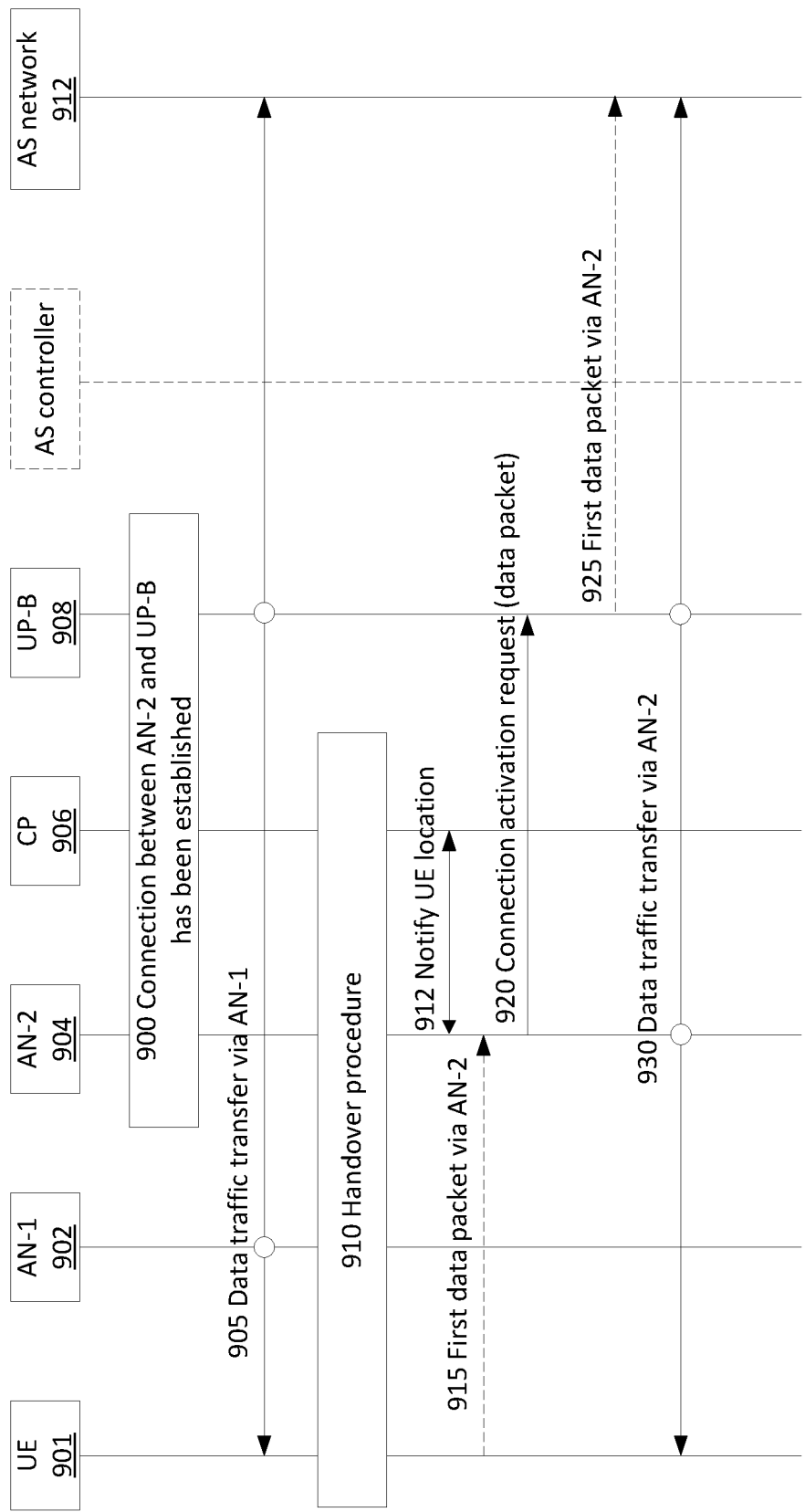
FIG. 8 illustrates a handover procedure involving pre-configured tunnels, according to an embodiment of the present invention.

FIG. 8 illustrates a handover procedure, including tunnel re-binding, in which pre-configured tunnels are implemented. Upon handover, the user plane (UP) is triggered to bind a PDU session to a different tunnel.

Having reference to FIG. 8, initially the connection between the AN-2 904 and UP-B 908 is already established (pre-configured) 900 (e.g. before handover takes place). Data traffic is being transferred 905 via a first RA node AN-1 902. A RAN handover procedure 910 is then performed, in which the protocol data unit (PDU) session is handed over from the first RA node AN-1 902 to the second RA node AN-2 904. During the handover, in an embodiment, the first RA node AN-1 902 is configured to forward any leftover data traffic of the UE 901 to the second RA node AN-2 904. Further, during the handover, the second RA node AN-2 904 binds the PDU session to the AN-UP-B connection pre-configured in operation 900. Next, the second RA node AN-2 904 notifies 912 the CP 906 of the UE location for location tracking purposes. Next, in some but not necessarily all cases, the second RA node AN-2 904 may receive 915 the first data packet associated with the PDU session. Next, the second RA node AN-2 904 transmits a tunnel binding request (notification) 920 to the UP-B gateway 908. In an embodiment, the first data packet received at AN-2 904 (if any) piggybacks on the request 920. Next, the UP-B GW 908 binds the PDU session to the pre-configured AN-UP-B connection. The binding is necessary for delivering DL traffic associated to the PDU session. The UP-B GW 908 identifies the data packet piggybacking on the tunnel binding request (if any) and transmits 925 the first data packet to the AS network 912. Subsequently, data traffic is transferred 930 via the RA node AN-2 904.

Figure 9:
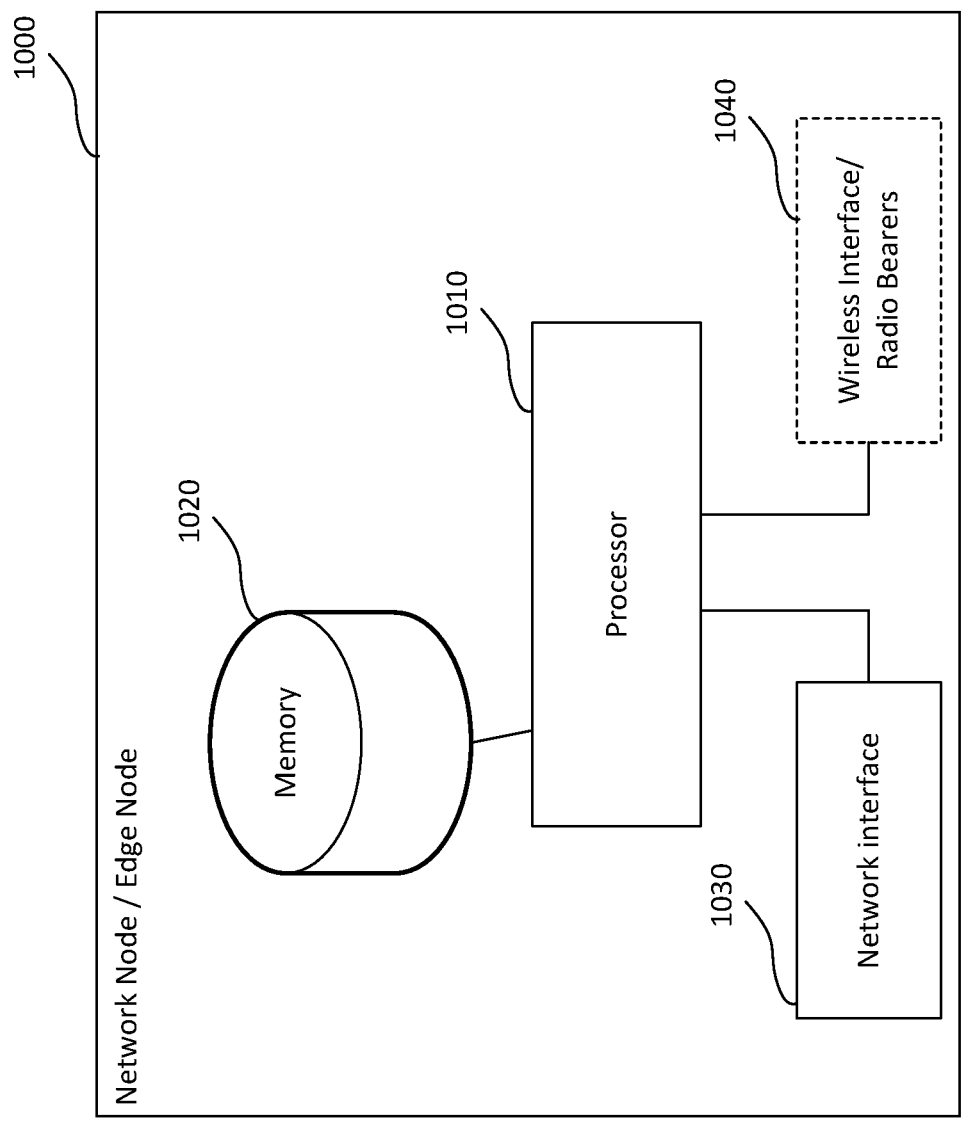
FIG. 9 illustrates a network node provided in accordance with embodiments of the present invention.

FIG. 9 is a block diagram illustrating a network node 1000 for use in carrying out the method and operations as discussed above. Multiple such network nodes may cooperate to implement the present invention. Each network node 1000 may implement one or more functions, such as but not limited to a CP-MM, CP-AU, CP-SM, UP function, user database function, gateway function, CP policy function, AS function, or network management function. A network node 1000 may operate as an edge node, such as an AN node or RA node, in which case the wireless interface or radio bearer interface 1040 is provided. It will also be understood that network functions may be virtual entities instantiated upon node 1000. If multiple such network functions are instantiated upon a single node 1000, they may appear as distinct logical entities.

The network node 1000 includes a network interface 1030 configured to communicate with other network nodes by transmitting and receiving data such as control plane data. The network node 1000 includes a memory 1020 storing program instructions and other information such as state information, database entries, packet data, and operating data, the program instructions including instructions for operating the network node as described herein. Multiple different types of memory may be provided for different uses. The network node 1000 includes a processor 1010 configured to execute the program instructions stored in the memory 1020, for example to process data received by the network interface 1030 and to generate data for transmission by the network interface 1030, and otherwise to implement various network functions and behaviors of nodes as described herein. In the case of an edge node, the processor 1010 also interacts with a wireless interface 1040 in order to wirelessly transmit and receive data from UEs. Network nodes 1000 may be provided using dedicated hardware, or via network function virtualization, in which components such as the network interface 1030, processor 1010 and memory 1020 are situated in one or more generic hardware platforms and configured to implement the functionality of one or more network nodes.

The present application further provides a process for Mobility Pattern (MP) based session management. In the process, a Session Management Function (SMF) can obtain from a Core Access and Mobility Management Function (AMF) the potential set of serving ANs associated with the UE in a short time window (e.g. the near future), which is determined by the AMF according to the UE's MP. According to the serving AN set associated with the UE and those of other UEs, the SMF can select UP paths for PDU sessions in order to minimize UP reselection or to balance UPF loads. In the case that the PDU session has a tight delay budget, such as in URLLC use cases, the SMF pre-configures tunnels at the ANs in the serving set of ANs the UE to reduce path-switching delay when handover happens among them.

Figure 10:
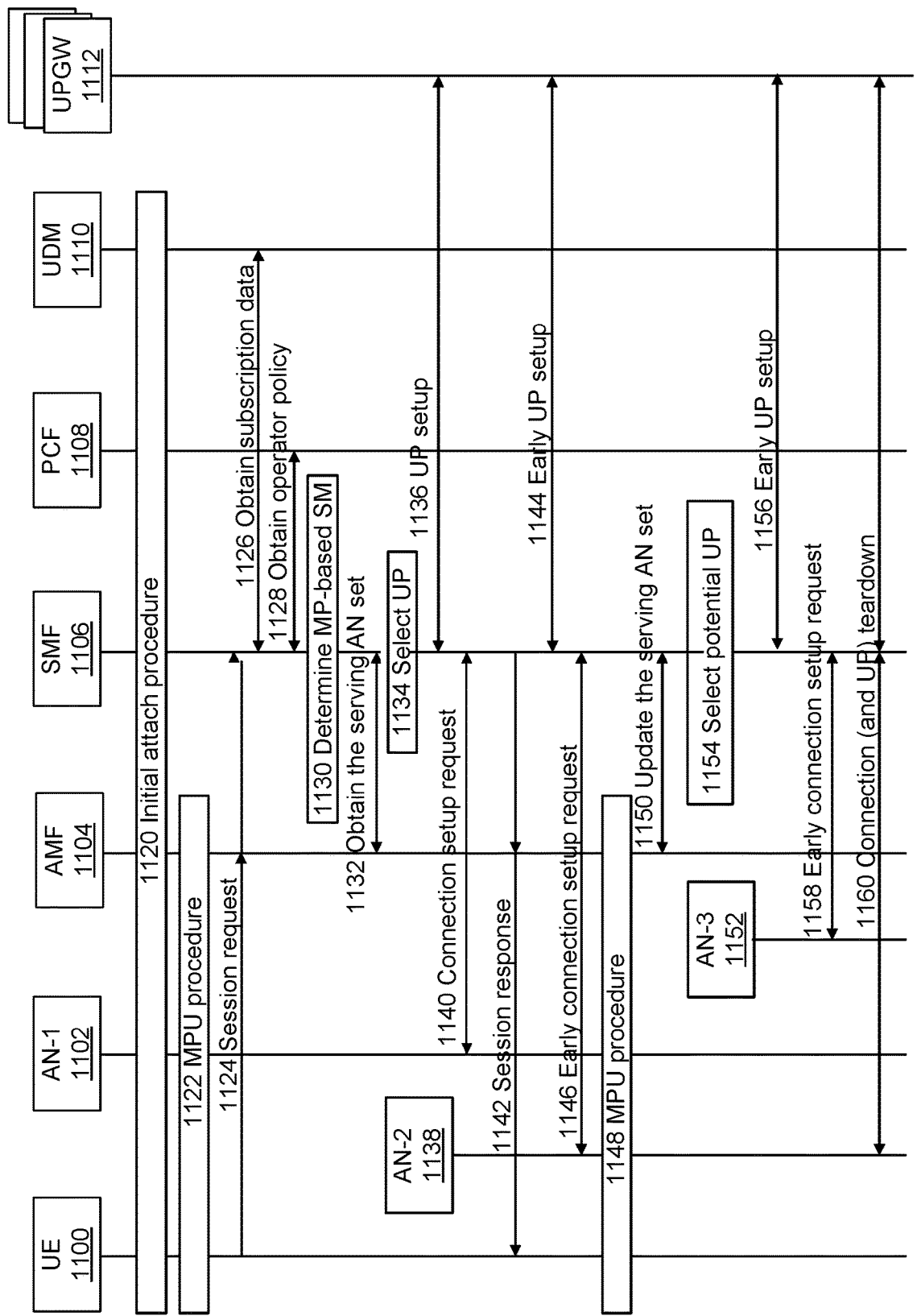
FIG. 10 presents a signaling diagram illustrating an embodiment of a MP-based PDU session establishment procedure.

FIG. 10 describes one embodiment of a MP-based PDU session establishment procedure to enable such MP-based session management optimization. As depicted in FIG. 10, it is assumed that the UE attach procedure 1120 has completed. The UE-assisted MP Update (MPU) procedure 1122 can proceed between the UE 1100 and the AMF 1104 via the AN-1 1102, which is the current serving AN of the UE 1100.

In step 1124 the UE 1100 sends a session request to the SMF 1106 via the AMF 1104. Next, in step 1126, the SMF 1106 obtains user subscription data from the UDM 1110 and, in step 1128, the SMF 1106 obtains at least one operator policy from the Policy Control Function (PCF) 1108.

The SMF 1106 determines 1130 to apply MP-based session management based on the obtained subscription data and the operator policies. At this step 1130, the SMF determines whether to perform tunnel pre-configuration.

In step 1132, if tunnel pre-configuration is to be performed for the PDU session at step 1130, the SMF 1106 obtains the serving set of ANs associated with the UE 1100 from the AMF 1104. The set of serving RA nodes ANs to be taken into account for UP selection. In the messaging exchange of step 1132, the SMF 1106 informs the AMF 1104 the criteria of constructing the serving AN set, e.g., a time window. In the example shown in FIG. 10, the serving AN set includes the AN-1 1102 and the AN-2 1138. The serving AN set includes the current serving AN, e.g. AN-1 1102, and the potential serving ANs determined with respect to the construction criteria.

In step 1134, the SMF 1106 selects the UP-1 for the PDU session with respect to the serving AN set, after which, in step 1136, the SMF 1106 sets up the UP-1 (e.g. UPGW 1112).

In step 1140 the SMF 1106 transmits to the RA node AN-1 1102 a connection setup request to set up connection to the UP-1 for the PDU session. At this step 1140, the AN-1 1102 may allocate RAN resources for the PDU session.

AN-1 11-2 may also transmit an acknowledgement confirming establishment of the connection setup to the SMF 1106 in step 1140.

In step 1142 the SMF 1106 sends a session response to the UE 1100 via the AMF 1104. The SMF 1106 then sets up 1144 the UP-2 (e.g. UPGW 1112) if the AN-2 1138 is to be connected to the UP-2.

In step 1146 the SMF 1106 transmits an early connection setup request to the AN-2 1138 as a request to set up connection to the UP-1 or the UP-2 for the PDU session in advance. At this step 1146, the SMF 1106 can also informs the AN-2 1138 of the need to store the PDU session context, including the PDU session ID and the UE IP address allocated for the PDU session.

The MPU procedure 1148 continues between the UE 1100 and the AMF 1104 via the AN-1 1102. First, in step 1150 the AMF 1104 determines to update the serving AN set and informs the update to the SMF 1106 of the updated serving AN set. In the example illustrated in FIG. 10, this updated serving AN set includes AN-1 1102 and AN-3 1152.

It will be understood that as discussed above, the MPU procedure 1148 between the UE 1100 and AMF 1104 makes use of a connection through AN-1 1102, but that in other embodiments, a different AN node may be used if the UE is connected to a different AN node.

In step 1154 the SMF 1106 selects potential UPs according to the updated serving AN set from step 1150. The SMF 1106 then sets up 1156 the UP-3 if the AN-3 1152 is to be connected to the UP-3.

It will be understood that in the above discussion, a selection of a UP is undertaken. This may include the selection of a UP function (which in the current example may be a UP Gateway). It should not be interpreted as a requirement to select an entirely new User Plane.

In step 1158 the SMF 1106 transmits an early connection setup request to the AN-3 1152 to set up connection to a UP for the PDU session in advance. Finally, in step 1160 the SMF 1106 tears down the UP-2 and the connection between AN-2 1138 and the UP-2. In some embodiments the early connection setup request (such as the request of step 1158) is to establish a connection between AN-2 1152 and one of UP1-1 and UP-3.

Figure 11:
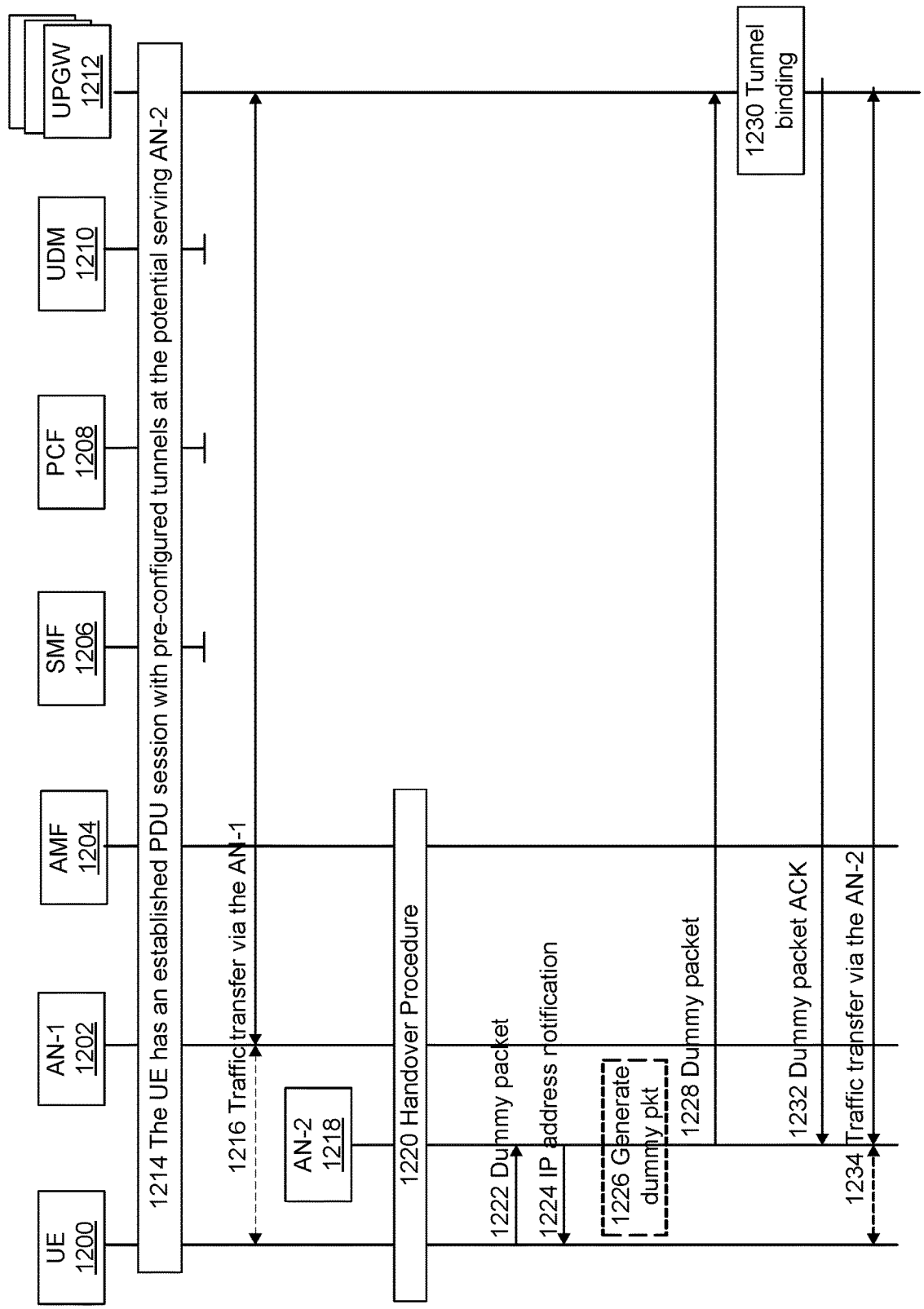
FIG. 11 presents a signaling diagram illustrating an embodiment of a handover-triggered PDU session modification procedure with pre-configured tunnels.

Similar to the above procedure, in a procedure for PDU session modification with preconfigured tunnels, the SMF obtains from the AMF the potential set of serving ANs of the UE in the near future, which is determined by the AMF according to the UE's MP. In the case that the PDU session has tight delay budget such as in URLLC use cases, the SMF pre-configures tunnels at the ANs in the serving AN set of the UE to reduce path-switching delay when handover happens among them. FIG. 11 illustrates this handover-triggered PDU session modification procedure with pre-configured tunnels.

As depicted in FIG. 11, the first step 1214 has been completed such that UE 1200 has an established PDU session, which is currently via the AN-1 1202. Traffic transfer 1216 with UE 1200 is via AN-1 1202. It is assumed that a tunnel has been pre-configured at the AN-2 1218 for the PDU session. This pre-configuration may have occurred in a previous messaging exchange, such as step 1214.

In step 1220 the PDU session is handed over to the AN-2 1218 from the AN-1 1202.

In step 1222 the UE 1200 sends a dummy packet to the AN-2 1218. This step is optional, depending on implementation.

In step 1224 the AN-2 1218 sends an IP address notification to UE 1200. The message includes the UE IP address associated to the PDU session. The IP address notification message may be generated by the SMF 1206 and stored at the AN-2 1218 as part of session context. In this case, the AN-2 1218 is performing delayed message forwarding. In certain aspects, the AN-2 1218 is preconfigured during step 1214 to handle the dummy packet. For example, in this case, a control plane management function (CPF), such as the SMF 1206, prepares the IP notification message in advance and configures the message to AN-2 1218. As would be readily appreciated, this is a specific example only and not intended to be limiting. The first step 1214 can comprise generation by a CPF, such as an SMF or AMF, of a delayed Non-Access Stratum (NAS) message, and configuration by the CPF of the delayed NAS message into an AN node that is configured to receive a PDU session handover, such as AN-2 1218. In an aspect, the delayed NAS message may be configured along with an associated is the condition, or set of conditions, under which the delayed NAS message needs to be delivered. A delayed IP address notification is one non-limiting example of a delayed NAS message.

The IP address may be different from the IP address(es) that the UE 1200 is using for the ongoing application sessions. If the session and service continuity (SSC) mode of the PDU session is 2, the UE uses the IP address for all the application sessions (ongoing and subsequent) associated to the PDU session; if the SSC mode is 3, the UE uses the IP address only for the application sessions started after the handover.

As should be readily appreciated, step 1224 is configured to be in response to the step 1220 when the optional step 1222 is not performed. When step 1222 is performed, step 1224 is configured to be in response to step 1222. Furthermore, when the optional step 1222 is not performed, optional step 1226 is performed, in which AN-2 1218 generates a dummy packet on behalf of the UE 1200.

In step 1228 the AN-2 1218 sends the dummy packet generated in step 1222 or step 1226 through the connection established for the PDU session to the CN (e.g. through the UPGW 1212). The data packet is marked as a special type of message in the header, implying that the receiver UPGW 1212 shall perform tunnel binding 1230 for the PDU session. In this tunnel binding step 1230, the receiver UPGW 1212 of the dummy packet checks the message type and binds the PDU session to the tunnel through which the packet is received. The binding is necessary for delivery of DL traffic of the PDU session to the AN-2 1218.

In step 1232 the UPGW 1212 informs the AN-2 1218 about the completion of tunnel binding by transmitting a data packet ACK to the AN-2 1218.

In the final step 1234, the traffic associated to the PDU session is transferred via the AN-2 1218 without the special message type being applied in the packet header.

If the UE 1200 starts to send data packets before step 1232 finishes, the AN-2 1218 will apply the special message type value to those packets. As soon as the tunnel binding step 1230 finishes, the AN-2 1218 stops applying the special message type value. The receiver UPGW 1212 does not perform tunnel binding or take any actions related to tunnel binding for data packets that are not of the special message type.

Those skilled in the art will appreciate that the special message type applied to packets by the AN-2 1218 may allow other nodes or functions that receive the packets to handle them in accordance with a set of instructions, e.g. to ensure proper handling. After the tunnel binding of step 1230 is complete, the need for the application of the special message type value is diminished or even removed, as the use of the tunnel binding provides the same instruction. For the purposes of efficiency the application of the special message type value can be stopped. Continuing the application of the special message type is not likely to cause adverse effects, but is not necessary.

The present application further provides a process for mobility pattern based UP management to remove or reduce runtime CP signaling related to path switching. In some embodiments that may aid in reducing end-to-end delay. The process may be suitable for PDU sessions that have a tight delay budget, such as those for Ultra-Reliable Low Latency Communications (URLLC).

Path switching can take place when a UE is handed over from a current serving AN to a target serving AN. It should be understood that the currently serving AN may be referred to as a Source AN, Before path switching completes, traffic, such as downlink (DL) traffic, is forwarded from the current serving/Source AN to the target AN. Traffic forwarding introduces a traffic forwarding delay that can contribute to the end-to-end delay associated with the data traffic. Path switching delay may extend traffic forwarding, increasing the end-to-end delay for additional data packets.

When an application such as a smart grid operation service, or a paramedic service has a tight delay budget, minimizing delay inducing traffic forwarding may be beneficial. As such, a measurement of path switching delay may be an important key performance indicator. The 3GPP Standard Specification TR 23.799 currently concludes that the Mobility Pattern (MP) should be made available to network functions associated with operations where the MP might be useful. In this context the MP, may be determined by a mobility pattern algorithm that is responsible for determining (or predicting) the UE's MP according to, for example, the UE's speed and moving direction, which may be learned from UE location reports, and other information such as map information. The procedure discussed below can be used to leverage the availability of the MP to incorporate use of the UE MP in path switching operations to reduce path switching delay and in some embodiments, end-to-end delay.

In the present procedure, the Session Management Function (SMF) identifies a need to pre-configure a connection (e.g. a connection, a tunnel, or other connection) to support a Protocol Data Unit (PDU) session according to the user preference, the user subscription data and/or operator policy. In the case that mobility-aware UP management is needed, the SMF can subscribe to Serving AN Set information. The Serving AN Set Information may include information such as the current serving AN and a set of potential ANs that can be available to serve the UE in the future depending upon the UE's mobility and network requirements. The SMF receives the set of potential ANs that will potentially serve the UE in the future based upon the UE's current MP from the Core Access and Mobility Management Function (AMF). According to the received information, the SMF can pre-emptively configure connections (e.g. tunnels) between these potential serving ANs and the UP. Any, or all of the potential AN's identified in the serving AN set may receive in advance UP-related connection information and UE context information. The UE context information may include, for instance, security credentials, N2 connection information, PDU session ID, Session and Service Continuity (SSC) mode configuration, and other connection information such as the information that is normally transferred during handover. In some aspects, the size of the set of serving ANs may be limited (e.g. 2-5 ANs) to control the amount of pre-configuration overhead that may not be used by all of the ANs in all cases.

In aspects, the mobility-aware UP management may be limited to intra-AMF handover. It can be deactivated during inter-AMF handover and re-activated afterwards.

The SMF can then bind the connections to the PDU session associated with UL traffic. The SMF and the AMF, respectively, can send, to the potential serving ANs, the UE context and the PDU session context. The UE and PDU session context information can then be cached at each of the potential serving ANs in order to support the potential future connection of the UE to the potential serving ANs.

Figure 12A:
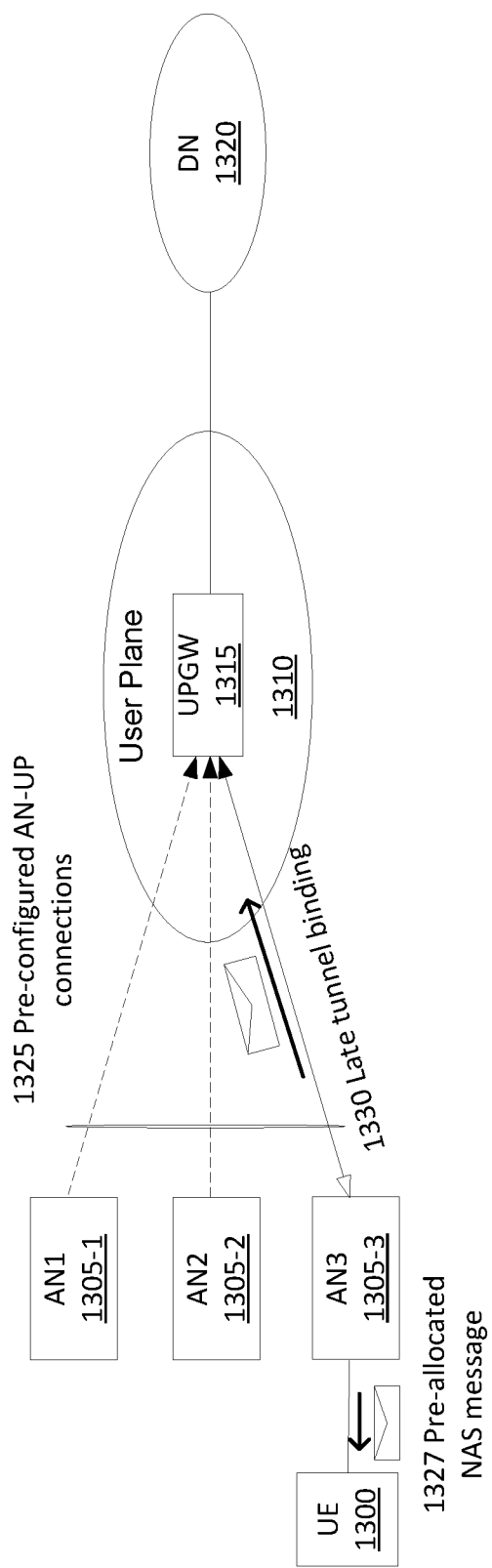
FIGS. 12A and 12B present embodiments of pre-configured access node-user plane connections for mobility-aware user plane management for path switching.

FIG. 12A illustrates the use of pre-configured AN-UP connections for mobility-aware UP management for path switching in accordance with one embodiment of this application. As depicted in FIG. 12A, in step 1325 the connections (e.g., the AN-UP tunnels) are preconfigured between each of AN from the potential serving AN set AN-1 1305-1, AN-2 1305-2, AN-3 1305-3, and the UPGW 1315 to support the potential future connection of the UE 1300. In an aspect, as part of the pre-configuration, the UE/PDU session context is cached at each AN from the set of potential serving ANs, i.e., AN-1 1305-1, AN-2 1305-2 and AN-3 1305-3. In step 1327 the target AN, i.e., AN-3 1305-3, transmits a pre-allocated NAS message to the UE 1300 indicating a new IP address due to IP anchor change. In an aspect, the pre-allocated NAS message may be cached at the target AN, i.e., AN-3 1305-3 during the pre-configuration stage.

In step 1330, upon receipt of the first UL packet associated with the PDU session through the connection (e.g., the tunnel AN3-UPGW as shown in FIG. 12A), the UPGW 1315 binds the connection through which the packet is received to the PDU session for DL traffic from the destination Data Network (DN) 1320. Benefits of the procedure include, but are not limited to, the following:

- Although connection (e.g. tunnel) pre-establishment does not avoid the requirement for signaling messages between the SMF (not shown) and the UP 1310, it does avoid runtime SMF-UPF signaling because those signal messages occur ahead of time during the preconfiguration phase. Thus, the signaling requirements don't create path switching delay. It should be understood that avoiding runtime SMF-UPF signaling may not entail completely avoiding the runtime signaling, and may entail a reduction in the runtime SMF-UPF signaling.
- Likewise, NAS message pre-allocation and caching help remove runtime signaling between the CP (e.g., SMF; not shown) and the UE 1300 at the time of connection since the NAS message is available at the target AN-3 1305-3 when called upon to make the connection.
- Late tunnel binding uses a data packet to trigger tunnel binding for DL traffic which avoids additional SMF-UPF signaling.
- Because the CP is not involved during path switching, the runtime signaling between CPFs (e.g. AMF and SMF) is also avoided.

Overall, the procedure illustrated in FIG. 12A can speed up path switching and reduce end-to-end delay.

Figure 12B:
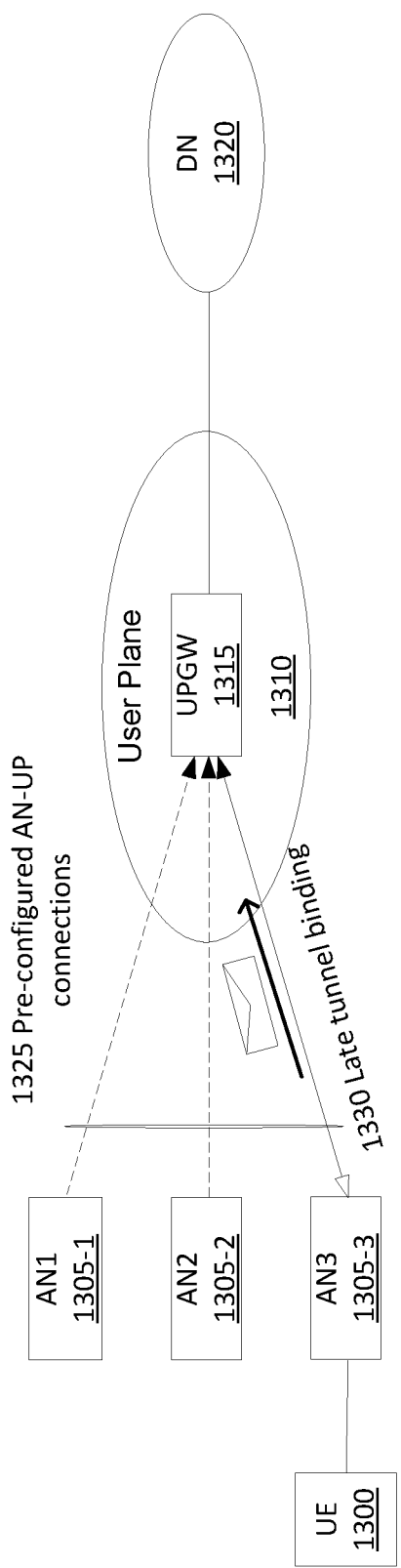

FIG. 12B illustrates another embodiment of the use of pre-configured connections (e.g. AN-UP tunnels) for mobility-aware UP management for path switching. As depicted in FIG. 12B, in this embodiment, in step 1325 the connections (e.g., the AN-UP tunnels) are preconfigured between the potential serving ANs, i.e. AN-1 1305-1, AN-2 1305-2, AN3 1305-3, and the UE context and the PDU session context are cached at the potential serving ANs AN-1 1305-1, AN-2 1305-2, AN3 1305-3. In step 1330, upon the receipt of the first UL packet associated with the PDU session through the connection (e.g., tunnel AN3-UP as shown in FIG. 12B), the UPGW 1315 binds the connection through which the packet is received (e.g. tunnel) to the PDU session for DL traffic. Benefits of this procedure may include, but are not limited to, the following:

Although connection pre-establishment may not remove the requirement for signaling messages between the SMF (not shown) and the UP 1310, it may reduce or remove runtime SMF-UPF signaling (because those signal messages occur ahead of time).

Late tunnel binding can use data packet as a trigger condition upon which connection (e.g., tunnel) binding for DL traffic can be undertaken, which may aid in reducing or avoiding the requirement for SMF-UPF signaling.

Because the CP involvement during path switching is not essential (and may be completely avoided), the runtime signaling between CPFs (e.g. AMF and SMF) can also be avoided in some embodiments.

Overall, the procedure illustrated in FIG. 12B can speed up path switching and reduce end-to-end delay, and is suitable for PDU sessions with a tight delay budget.

Because the target AN, during handover, can already have information associated with the UP related connection (e.g. connection information, the UPGW identifier, or tunnel end point ID, etc.), no interaction with CP functions and entities is necessary to allow UL data transfer. This allows for a reduced response time to handover request messages (for example, in X2 based handover in LTE). The response time for UL traffic can thus be reduced towards a 0 delay from at least a 4 hop (processing and transmission) delay (target AN→AMF→SMF→AMF→target AN).

The reference above to the target AN already having information associated with the UP related connection, may be a result of the AN maintaining session and UE context information.

Further, as a result of the data packet triggered late binding, the path switching delay for DL traffic can be reduced to a 1 hop delay (e.g. path 3 in FIG. 17) from at least a 3 hop (processing and transmission) delay (e.g. path 2 in FIG. 17) (target AN→AMF→SMF→UPF (e.g. UPGW)), to configure the UPF 1315 with the AN-related connection information. As shown in the illustrative embodiment, the delay includes both transfer delay and processing delay.

In another aspect, the present application provides a session management procedure for mobility pattern based UP path management. In this procedure, the SMF identifies the need for connection (e.g., tunnel) pre-configuration for a PDU session according to at least one of UE preference, subscription data, and operator policy. The SMF receives from the AMF the potential serving AN set based on the UE MP. According to the information, the SMF pre-configures the connections (e.g., tunnels) between these potential serving ANs and the UP and binds the connections to the PDU session for UL traffic. The AMF and the SMF further send to these potential serving ANs the UE context (which can be communicated with a pre-allocated NAS message, e.g. a traffic redirection request indicating a new IP address to use, session response, etc.) and PDU session context, which may then be cached by the potential serving ANs.

Figure 13A:
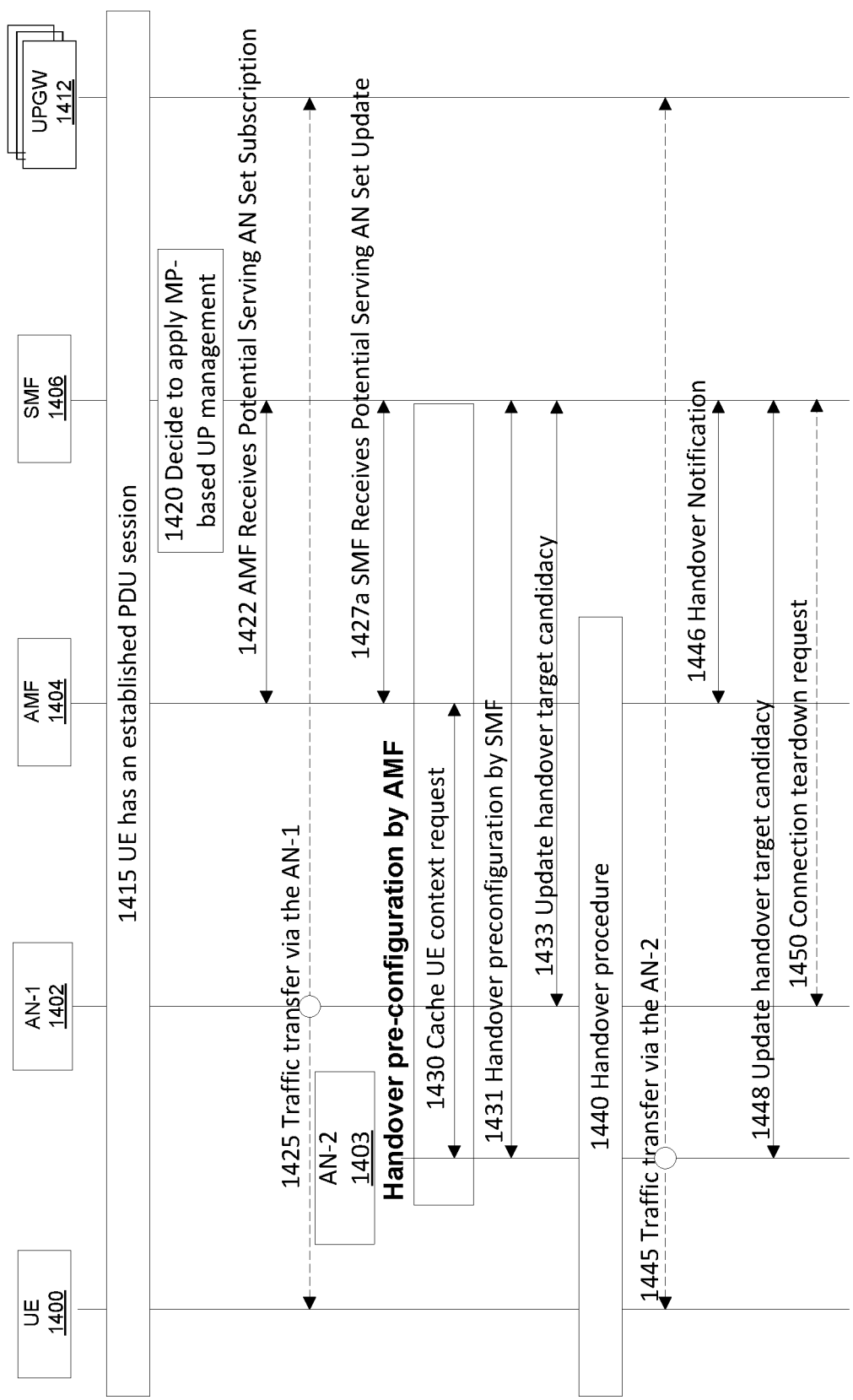

FIG. 13A is a signaling diagram that illustrates one embodiment of a mobility pattern based connection (e.g., tunnel) pre-configuration procedure. It is assumed, in step 1415, that UE 1400 has an established PDU session, and the traffic associated to the PDU session is transferred via the AN-1 1402.

In step 1420, the SMF 1406 determines to apply MP-based UP management for the PDU session according to the UE 1400 preference, user subscription data and operator policy, which is obtained during the PDU session establishment. In step 1422, the SMF 1406 subscribes to the Potential Serving AN Set through the procedure of receiving the Potential Serving AN Set Subscription service from the AMF 1404. Step 1422 is optional if the SMF 1406 has already subscribed to the information. It should be recognized that steps 1420 and 1422 can be integrated within the PDU session establishment procedure. However, they should take place before the SMF 1406 selects the UP so that the UP-selection decision can take into account the set of potential serving ANs. As indicated in FIG. 13A, at this point traffic transfer 1425 is via the AN-1 1402.

In step 1427a the AMF 1404 updates the SMF 1406 with the latest Potential Serving AN Set of the UE 1400 through the procedure of receiving the Potential Serving AN Set Update of the SMF 1406. In the embodiment shown in FIG. 13A, the latest Potential Serving AN Set includes the AN-2 1403 as a new potential serving AN.

Next, in step 1430, the AMF 1404 may pre-allocate NAS messages related to mobility management for the UE 1400 and transmits the pre-allocated NAS messages and the UE context (e.g., security credentials) to the AN-2 1403.

It will be understood that the UE context information and NAS messages may include the security credentials, and in addition may include information such as N3 connection information and other network configuration related information. This information, from the NAS messages and UE context may be provided to AN-2 1403 as a request to cache UE context.

In step 1431, the handover preconfiguration by the SMF 1406, the SMF 1406 transmits a request to the AN-2 1403 to set up connection to the UP for the PDU session. At this step 1431, the SMF 1406 may pre-allocate NAS messages (e.g., traffic redirection request, session response) related to session management and transmits the pre-allocated NAS messages and the PDU session context (e.g. the PDU session ID, SSC configuration) to the AN-2 1403. The NAS message pre-allocated by the SMF 1406 can be used to support handover with UPGW 1412 change or IP anchor change.

In step 1433 the SMF 1406 transmits the potential serving AN set of the UE 1400 to the AN-1 1402 as the handover target candidates for the UE 1400.

The potential serving AN set sent in step 1433 may be sent to AN-1 1402 so that it can update a stored handover target candidate list.

In handover procedure 1440 the UE 1400 is handed over from the AN-1 1402 to the AN-2 1403 using a handover with pre-configured AN-UP tunnel and late tunnel binding (as detailed further below). After completion of procedure 1440, in step 1445, traffic transfer occurs via AN-2 1403. Following which, in step 1446, the AMF 1404 notifies the SMF 1406 about the handover. Upon receipt of the handover notification, in step 1448, the SMF 1406 communicates the Serving AN set of the UE 1400 to the AN-2 1403 of the handover target candidates for the UE 1400. Finally, in step 1450, the SMF 1406 requests the AN-1 1402 to tear down the connection to the UP for the PDU session, if the AN-1 1402 is not in the serving AN set of the UE 1400.

It will be understood that in step 1446, the AMF 1404 may notify the SMF 1406 of the handover by way of a handover notification message. The SMF 1406 notifying AN-2 1403 of the handover target candidates may be performed responsive to receive of the handover notification message in step 1446, and may be performed through sending AN-2 1403 an update handover target candidacy message.

Figure 13B:
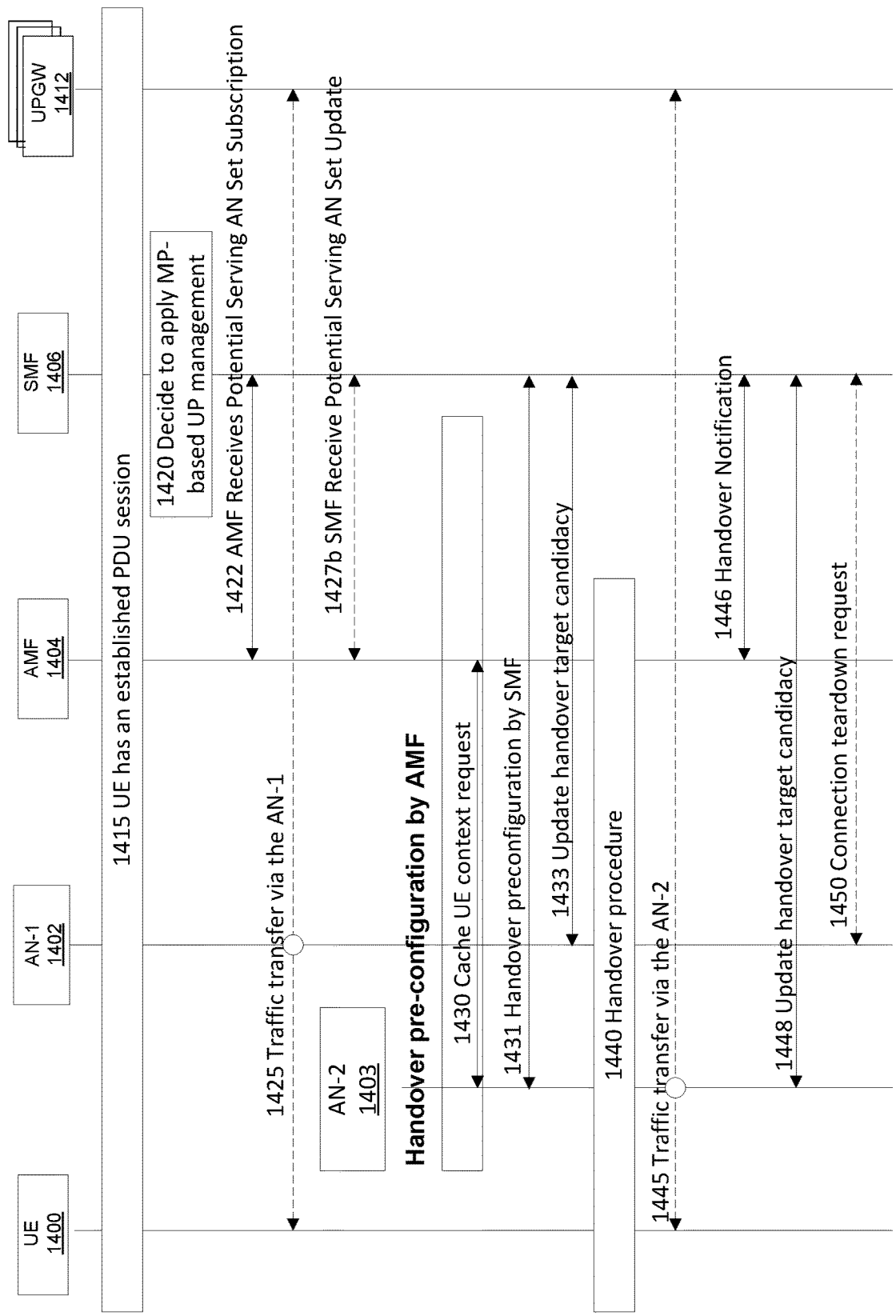

FIG. 13B is a signaling diagram that illustrates another embodiment of a mobility pattern based connection (e.g., tunnel) pre-configuration procedure. This embodiment is similar to the procedure illustrated in FIG. 13A, except that in step 1430 the AMF 1404 communicates to the AN-2 1403 only the UE 1400 context (e.g., security credentials). In step 1431 the SMF 1406 requests the AN-2 1403 to set up the connection to the UP for the PDU session and communicates to the AN-2 1403 the PDU session context (e.g., the PDU session ID, SSC mode configuration, QoS marking rules).

In step 1430, the cache UE context request may include a variety of different types of UE context information including both security credentials and N2 connection information. In step 1432, the SMF 1406 may transmit the request by way of a handover preconfiguration message.

In step 1433 the SMF 1406 communicates the Serving AN Set of the UE 1400 to the AN-1 1402 as the handover target candidates for the UE 1400. The handover procedure 1440 and following steps 1446, 1448 and 1450 then proceed, as described above in relation to FIG. 13A. This communication of the serving AN set may be transmitted as part of an update handover target candidacy message.

Figure 13C:
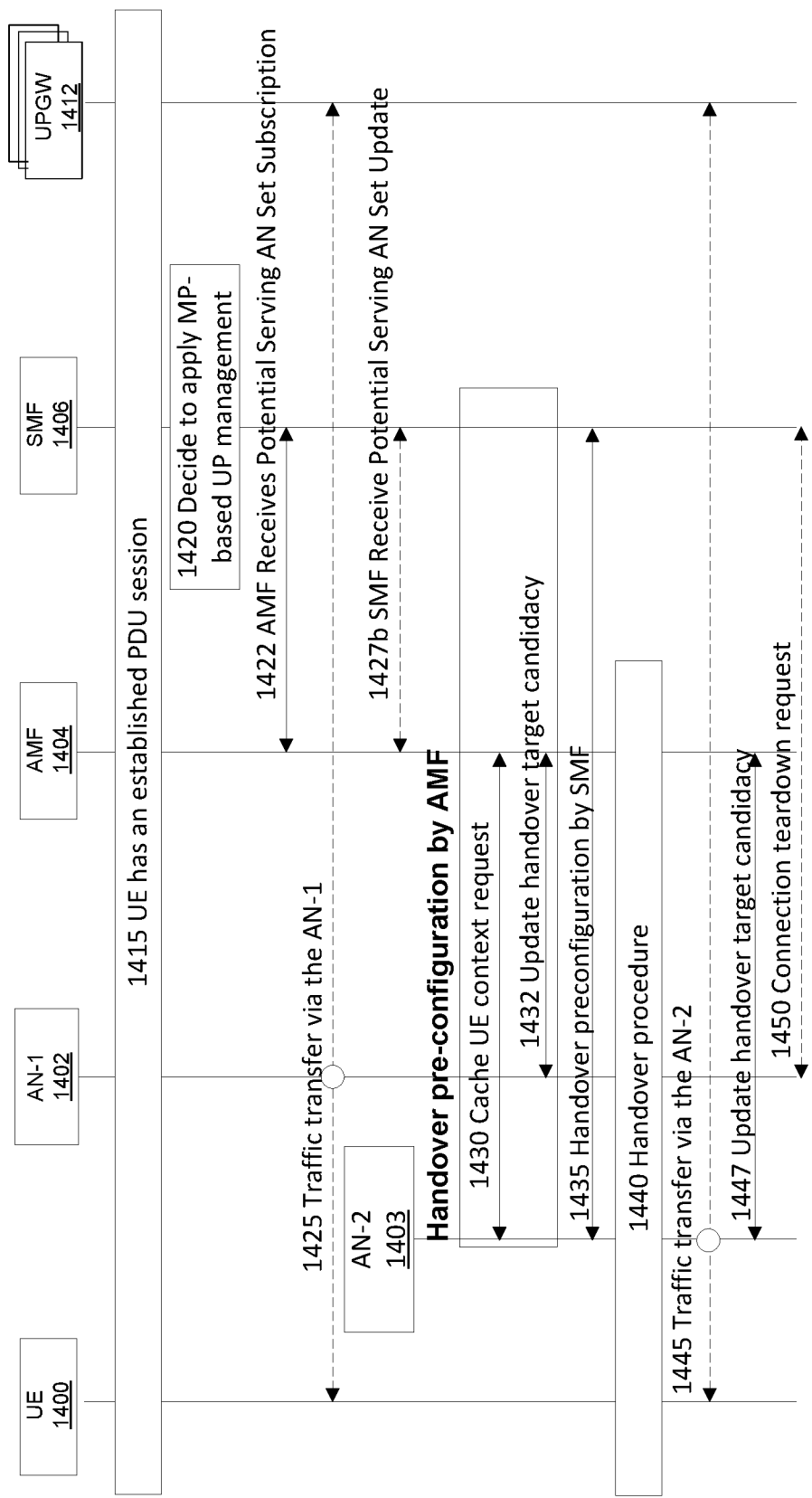

FIG. 13C is a signaling diagram that illustrates another embodiment of a mobility pattern based connection (e.g., tunnel) pre-configuration procedure. This embodiment is similar to those illustrated in FIGS. 13A and B. In this embodiment, at step 1430 the AMF 1404 communicates to the AN-2 1403 only the UE 1400 context (e.g., security credentials). In step 1432 the AMF 1404 communicates the Serving AN Set of the UE 1400 to the AN-1 1402 as the handover target candidates for the UE 1400. Optionally, steps 1430 and 1432 can be carried out in parallel.

Step 1430 the UE context may be sent to AN-2 1403 in a cache UE context request. The UE context may include information other than the security credentials such as N2 connection information and other network connectivity details. The information transmitted in step 1432 may be provided in an update handover target candidacy message.

In step 1435, handover preconfiguration by the SMF 1406, the SMF 1406 requests the AN-2 1403 to set up a connection to the UP for the PDU session. At this step 1435, the SMF 1406 informs the AN-2 1403 of the PDU session context (e.g., the PDU session ID, Session and Service Continuity (SSC) mode configuration, QoS marking rules, etc.).

In the handover procedure 1440 the UE 1400 is handed over from the AN-1 1402 to the AN-2 1403 using a handover with pre-configured AN-UP tunnel and late tunnel binding (as detailed further below). The final step of the handover procedure 1440 is a handover notification step. Upon handover notification, in step 1447, the AMF informs the Serving AN Set of the UE 1400 to the AN-2 1403 as the handover target candidates for the UE 1400.

The handover targets may be provided to AN-2 1403 by transmitting an update handover target candidacy message to AN-2 1403.

Finally, in step 1450, the SMF 1406 requests the AN-1 1402 to tear down the connection to the UP for the PDU session, if the AN-1 1402 is not in the Serving AN Set of the UE 1400.

The request to tear down the connection to the UP may be provided to AN-1 1402 by transmitting a connection teardown request to AN-1 1402.

Figure 13D:
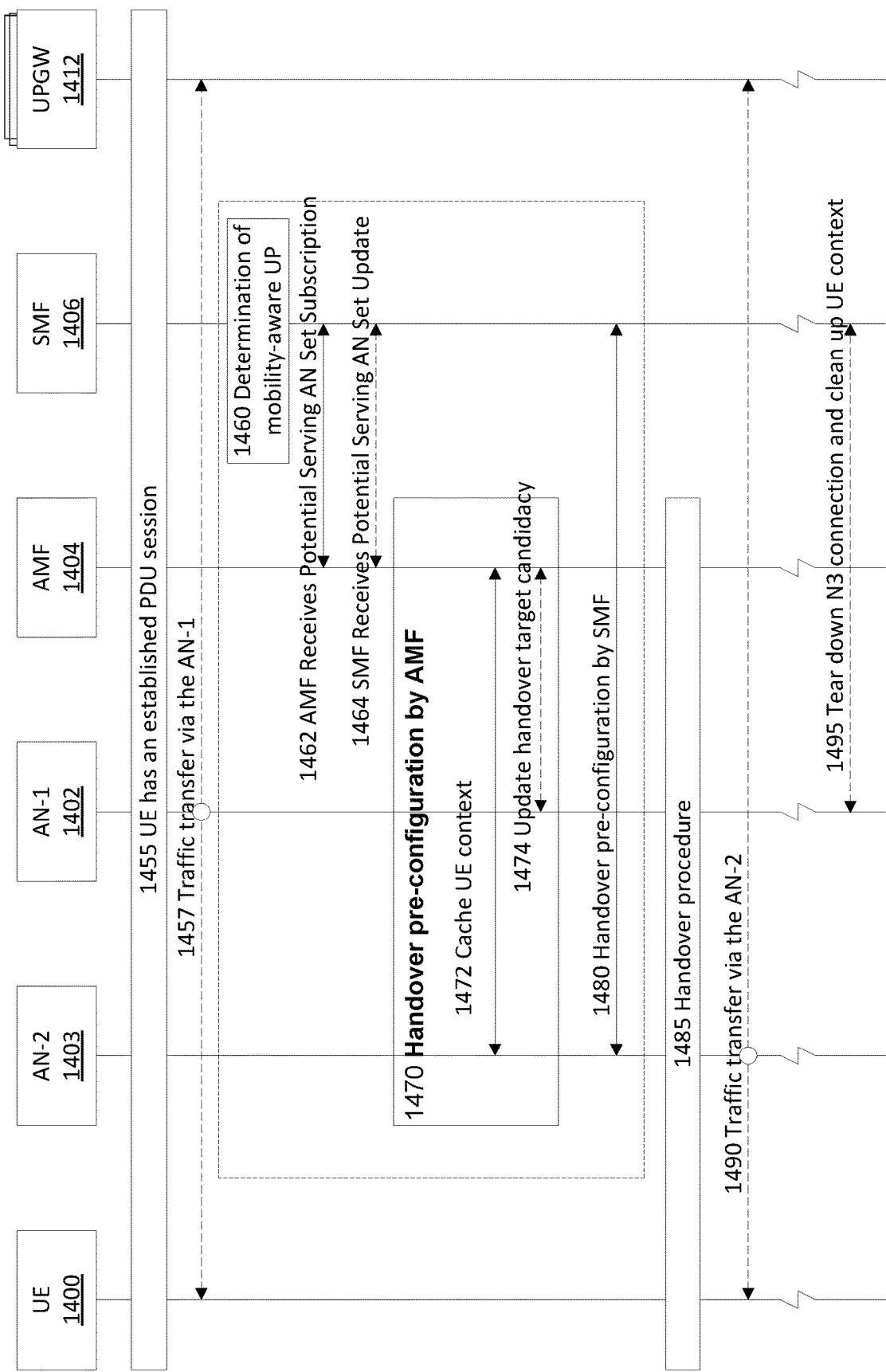

FIG. 13D is a signaling diagram that illustrates another embodiment of a mobility-aware UP management procedure. It is assumed, in step 1455, that UE 1400 has an established PDU session, and, as shown in step 1457, the traffic associated to the PDU session is transferred via the AN-1 1402.

In step 1460 the SMF 1406 decides to perform mobility-aware UP management for the PDU session according to the UE preference, user subscription data and operator policy, which is obtained during the PDU session establishment in step 1455. This decision includes a mobility-awareness time window. This determination in step 1460 may be a determination of a mobility-aware UP.

In step 1462 the SMF 1406 either subscribes to the information of Potential Serving AN Set or updates a previous subscription to obtain a current Potential Serving AN Set for the UE 1400 from the AMF 1404. The Potential Serving AN Set includes the current serving AN (e.g. AN-1 1402) of the UE 1400 and the other ANs that will potentially serve the UE within the mobility-awareness time window as determined based upon the MP of the UE 1400 (e.g. AN-2 1403 in this example). In the subscription, the SMF 1406 may inform the AMF 1404 to perform handover pre-configuration at the ANs in the Potential Serving AN Set. The SMF 1406 may subscribe in step 1462 by transmitting a potential serving AN set subscription to AMF 1404.

The step 1462 is optional if the SMF 1406 has already subscribed to the information and if the subscription satisfies the mobility-awareness time window determined at the step 1460. Further, steps 1460 and 1462 can be integrated within the PDU session establishment procedure 1455. However, these steps should take place before the SMF selects UP so that the UP selection decision can take the information of Potential Serving AN set into account.

In step 1464 the AMF 1404 updates the SMF 1406 with the latest Potential Serving AN Set of the UE 1400 via a procedure of receiving Potential Serving AN Set Update of the SMF 1406. In this step 1464 it is assumed that the latest Potential Serving AN Set includes the AN-2 1403 as a new potential serving AN. Through the update response message to the AMF 1404, the SMF 1406 informs the AMF 1404 to perform handover pre-configuration at the ANs in the Potential Serving AN Set if it did not indicate so at the step 1462.

In step 1470 the AMF initiates the handover pre-configuration procedure according to the handover pre-configuration indication at the step 1462 or 1464. Step 1470 includes step 1472 in which the AMF 1404 informs the AN-2 1403 of the AMF-related UE context information that is normally transferred during handover (e.g., security credentials) for caching. In step 1474, if the AN-2 1403 is a potential handover target of the UE 1400, the AMF 1404 informs the AN-1 1402 of the candidacy. The AMF 1404 may identify handover target candidacy based on the adjacency of the AN-2 1403 to the AN-1 1402, for example. The AN-1 1404 will instruct the UE 1400 to perform the handover according to the handover target candidacy.

Step 1470, which may include the transmission of messages 1472 and 1474 may be considered a handover pre-configuration that is performed by AMF 1404. It will also be understood that the UE context information that is transmitted for caching may include information other than the security credentials, such as N2 connection information associated with the connection between an AN (e.g. at least one of AN-1 1402 and AN-2 1402 in the current example) and the AMF 1404. Following the cached UE context message sent to AN-2 1403 in step 1472, the AMF 1404 may inform AN-1 1402 of the candidacy of AN-2 1403, using an update handover target candidacy message in step 1474.

The step 1470 handover pre-configuration by the AMF 1404 is independent of the PDU session, and is shared by the other PDU sessions of the UE 1400 for mobility-aware UP management. Optionally, steps 1472 and 1474 of the pre-configuration 1470 can be performed in parallel.

In response to the step 1464, in step 1480 the SMF 1406 performs handover pre-configuration, including informing the AN-2 1403 of the UP related connection information (e.g. UPGW identifier, or tunnel endpoint ID, etc.) for the PDU session and informing the AN-2 1403 of the UE 1400 context related to the PDU session (e.g., the PDU session ID, SSC mode configuration, QoS rule, etc.) for caching. The RAN may exploit the UE 1400 context cached at the ANs at the steps 1464, 1470, and 1480 to simplify RAN handover.

In step 1485, the UE 1400 is handed over from the AN-1 1402 to the AN-2 1403 through a procedure of handover with mobility-aware UP management, as detailed further below. Following step 1485, in step 1490, traffic transfer between UE 1400 and UPGW 1412 is via AN-2 1403.

In step 1495, SMF 1406 requests the AN-1 1402 to tear down the connection for the PDU session and to clean up the UE 1400 context, if the AN-1 1402 is no long present in the Potential Serving AN Set of the UE 1400.

The present application further provides a handover procedure with mobility-aware UP management. In one aspect, the procedure is a handover procedure with pre-configured AN-UP Connection (e.g., tunnel) and late connection binding.

Figure 14A:
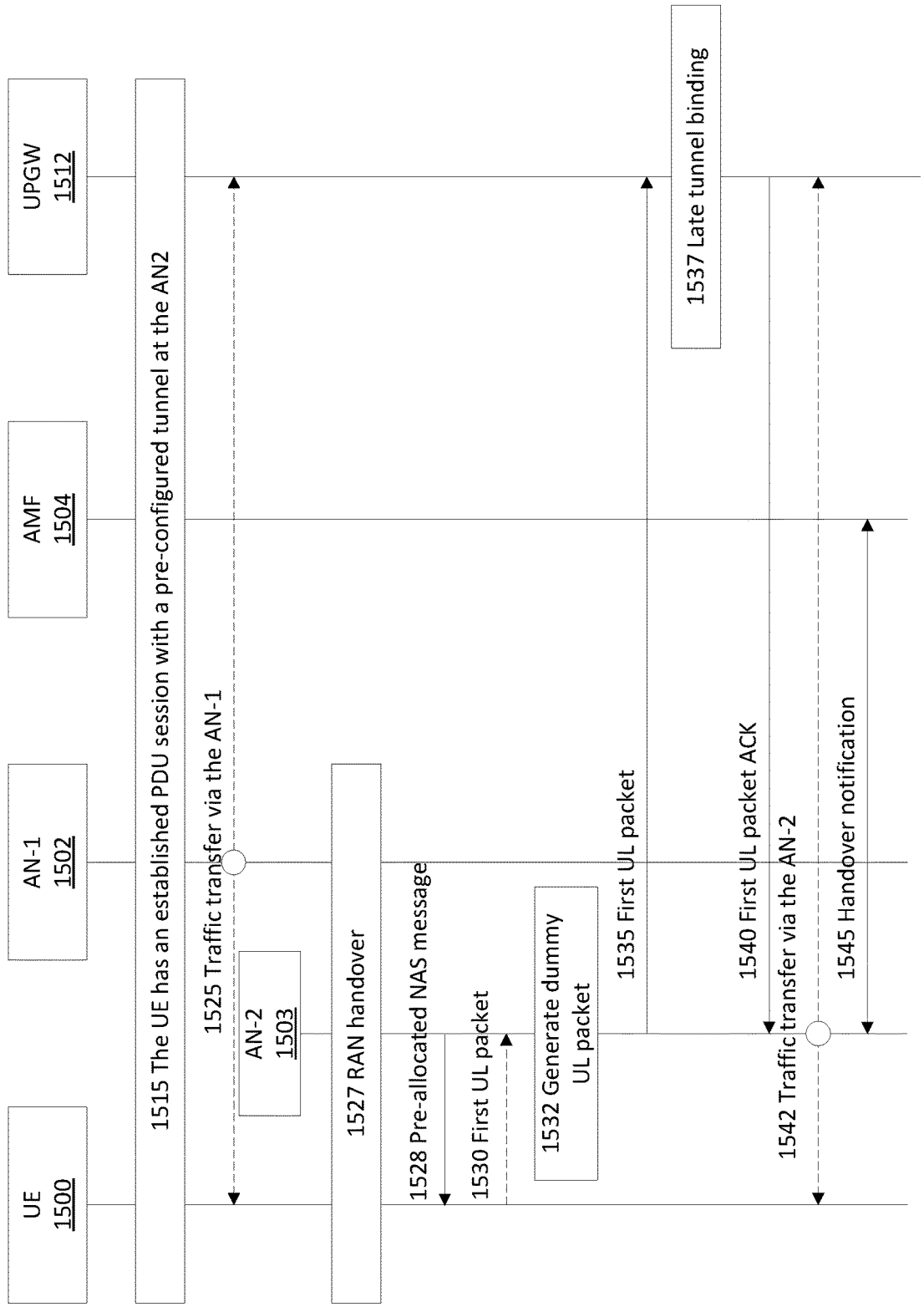
FIGS. 14A, 14B, and 14C present signaling diagrams illustrating embodiments of a handover procedure.

FIG. 14A is a signaling diagram illustrating one embodiment of a handover procedure based on pre-configured AN-UP connection (e.g., tunnel) and late connection (e.g., tunnel) binding. It is assumed, in step 1515, that the UE 1500 has an established PDU session, and, in step 1525, the traffic associated to the PDU session is transferred via the AN-1 1502. It is further assumed that an AN-UP connection (e.g., tunnel) has been pre-configured at the AN-2 1503 for the PDU session.

In step 1527 the PDU session is handed over to the AN-2 1503 from the AN-1 1502, following which, in step 1528, the AN-2 1503 sends a pre-allocated NAS message (e.g., a traffic redirect request, indicating a new IP address, in case of IP anchor change) to the UE 1500. The AN-2 1503 receives the pre-allocated NAS message from the SMF (not shown) during the reconfiguration of the connection between the AN-2 1503 and the UP.

In optional step 1530 the AN-2 1503 receives the first UL packet from the UE 1500. If step 1530 is not performed, then, in step 1532, the AN-2 1503 generates a dummy packet as the first UL packet of the UE 1500.

In step 1535, the AN-2 1503 sends the first UL packet through the preconfigured connection for the PDU session to the UP. The data packet is marked as a special type of message in the header, implying that the UPGW 1512 shall perform late Connection binding for the PDU session.

In step 1537 the UPGW 1512 checks the message type and binds the PDU session to the Connection through which the packet is received. This late binding is necessary for delivery of DL traffic associated to the PDU session to the AN-2 1503. It will be understood that in some embodiments, this process may be referred to as late tunnel binding.

In step 1540 the UPGW 1512 transmits an acknowledgement to the AN-2 1503 confirming receipt of the first UL packet, and thereby confirming completion of late connection binding (e.g. late tunnel binding).

In some embodiments, a DL packet associated with the PDU session is received by the UPGW 1512, and transmitted by the UPGW 1512 to AN-2 1503 to act in place of the specific acknowledgement step 1540. In these embodiments, receipt of the DL packet associated with the PDU session by AN-2 1503 confirms receipt by the UPGW 1512 of the first UL packet, and further confirms completion of the late connection binding (e.g. late tunnel binding).

If the UE 1500 starts to send data packets before the step 1540 completes, the AN-2 1503 will apply the special message type value (i.e. a flag) to those packets. The UPGW 1512 performs late connection binding for data packets that include the special message type flag, and does not perform late connection binding for data packets that are not of the special message type. As soon as the step 1540 completes, the AN-2 1503 stops applying the special message type value. At this point, in step 1542, traffic transfer occurs via the AN-2 1503.

Finally, in step 1545 the AN-2 1503 notifies the AMF 1502 about the handover.

Figure 14B:
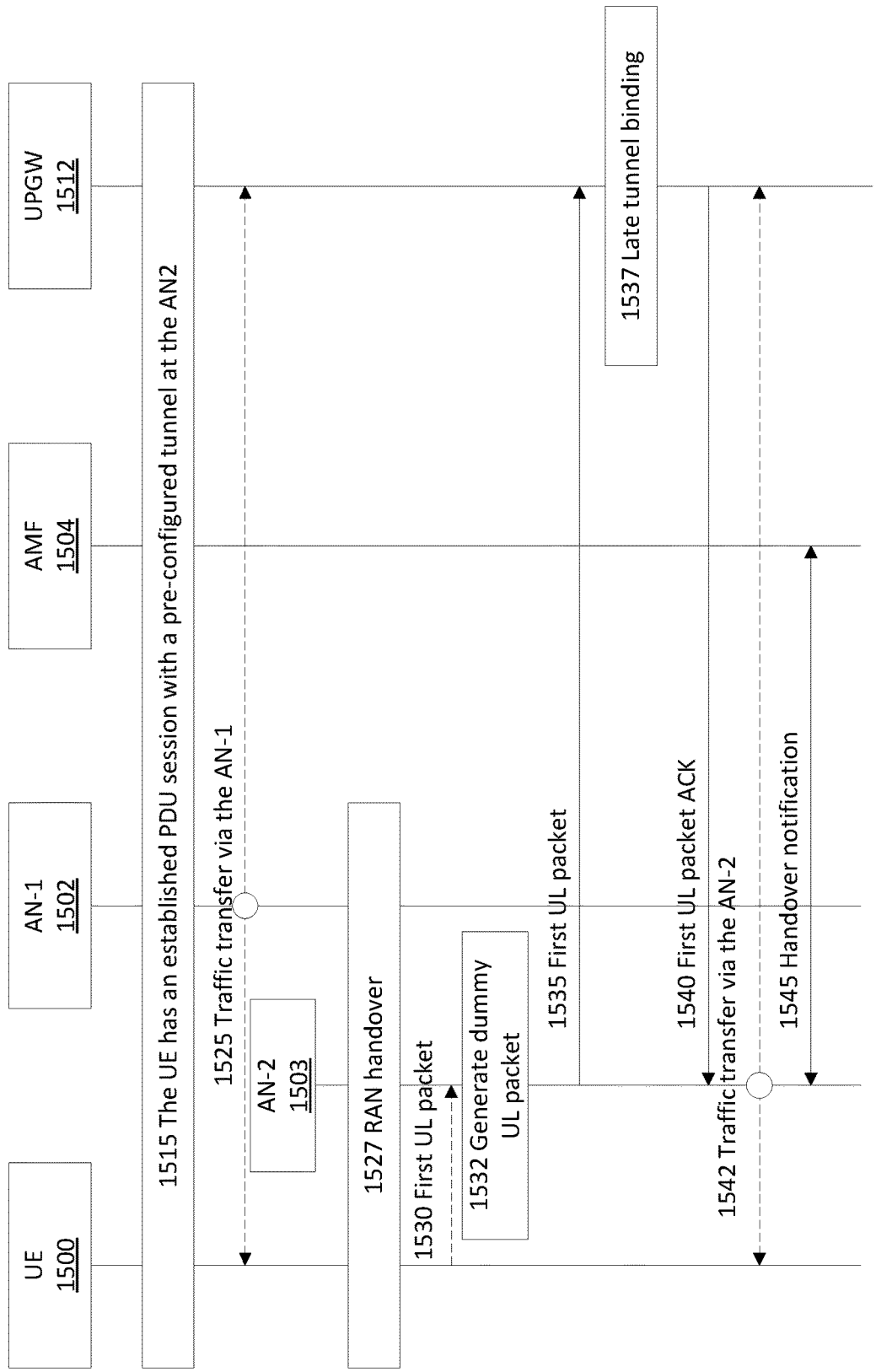

FIG. 14B is a signaling diagram that illustrates another embodiment of a handover procedure based on pre-configured AN-UP Connection (e.g., tunnel) and late connection (e.g., tunnel) binding. This embodiment is similar to the procedure illustrated in FIG. 14A, except that it does not include step 1528 (i.e., the AN-2 1503 does not send a pre-allocated NAS message (e.g., a traffic redirection request) to the UE 1500). Rather, in the embodiment illustrated in FIG. 14B, following step 1527, in which the PDU session is handed over to the AN-2 1503 from the AN-1 1502, step 1530 (receipt of the first UL packet from the UE 1500) is optionally performed, or step 1532 (generating a dummy UL packet) is performed if step 1530 is not carried out. The remaining steps 1535, 1537, 1540, 1542, and 1545 are carried out as described above in relation to FIG. 14A.

Figure 14C:
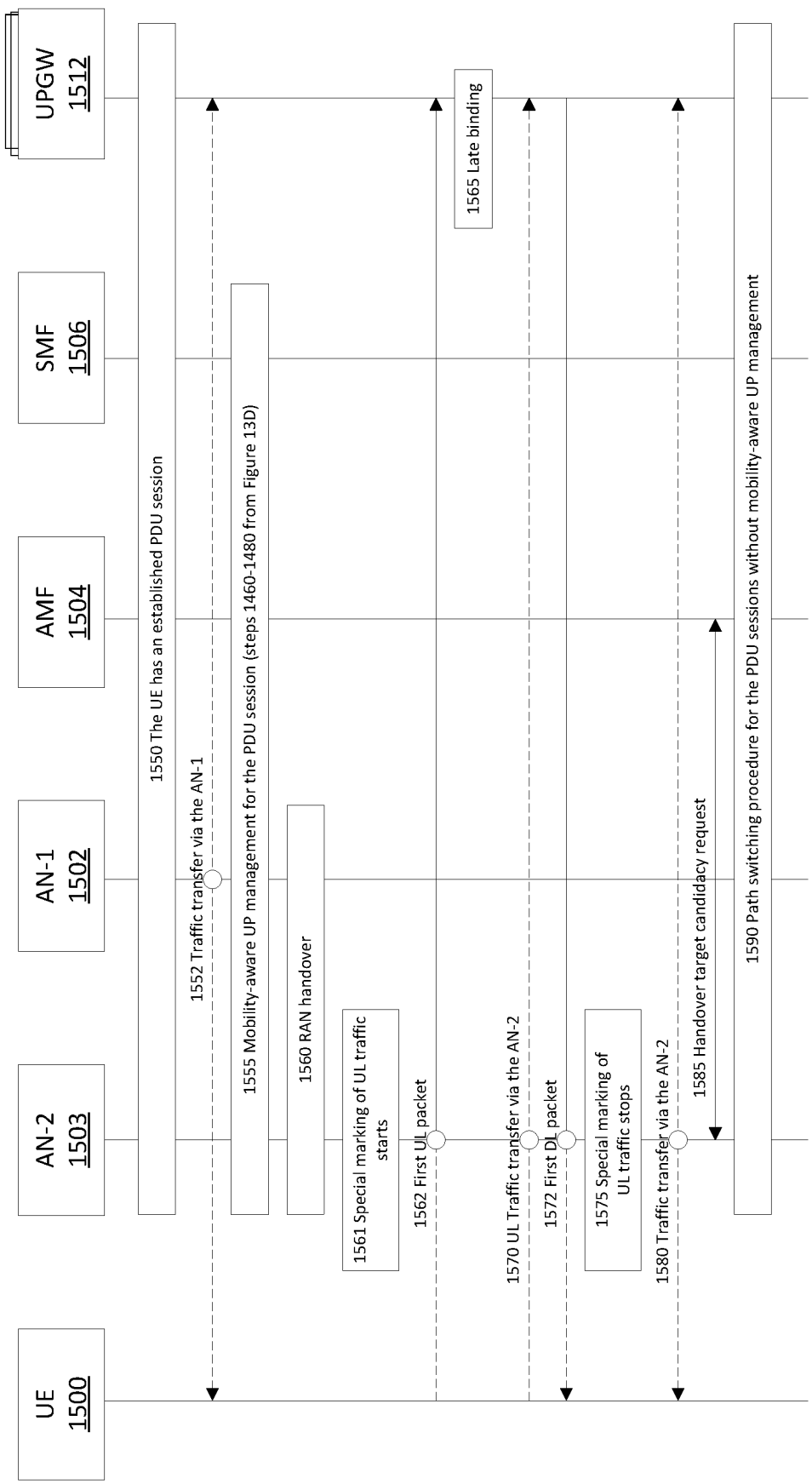

FIG. 14C is a signaling diagram that illustrates another embodiment of a handover procedure with mobility-aware UP management. As in the procedure shown in FIGS. 14A and B, it is assumed, in step 1550, that UE 1500 has an established PDU session, and, in step 1552, the traffic associated to the PDU session is transferred via the AN-1 1502. It is further assumed that, in step 1555, mobility-ware UP management is performed for the PDU session (i.e., steps 1360-1380 of FIG. 13D).

In step 1560 the UE 1500 is handed over to the AN-2 1503 from the AN-1 1502. At the end of RAN handover, in step 1561, the AN-2 1503 starts to apply special marking to UL traffic associated to the PDU session.

In step 1562 the first UL packet associated to the PDU session is sent to the UPGW 1512. In the absence of UL traffic, the first UL packet is a zero-length packet generated by the AN-2 1503.

In step 1565 the UPGW 1512 detects the special marking of the UL packet and binds the PDU session to the Connection through which the UL packet is received. This late binding is triggered by the detection of the special marking and is necessary for delivery of DL traffic associated to the PDU session to the AN-2 1503. It should be noted that, before the step 1565 completes, in step 1570 the DL traffic associated to the PDU session is sent to the AN-1 1502 and then forwarded to the AN-2 1503. It will be understood that step 165 may be referred to as late tunnel binding in some embodiments.

In step 1572 the AN-2 1503 receives the first DL packet associated with the PDU session, which indicates the completion of the late binding. In the absence of DL traffic, the DL first packet is a zero-length DL packet generated by the UPGW 1512. Upon the reception of the DL packet, the AN-2 1503 stops special marking of UL traffic for the PDU session. The UPGW 1512 does not perform late binding for UL packets that do not carry the special marking. At this point, as shown in step 1580, traffic is transferred via AN-2 1503.

In step 1585 the AN-2 1503 requests information about the candidate handover targets of the UE 1500 from the AMF 1504, which may be the entire Potential Serving AN Set of the UE 1500 or a subset of it. If the UE has another PDU session and if that PDU session has no pre-configured Connections (e.g., tunnels), then AN-2 1503 starts the regular path switching procedure for that PDU session. This step 1590 may take place in parallel with the steps 1562, 1565 and 1572.

It will be understood that in some embodiments, the regular path switching procedure referred to above may occur in step 1590, and it may entail path switching for PDU sessions without mobility-aware UP management. If step 1590 is performed in parallel with steps 1562, 1565 and 1572, it may allow for the accommodation of the PDU sessions without mobility-aware UP management.

Figure 15:
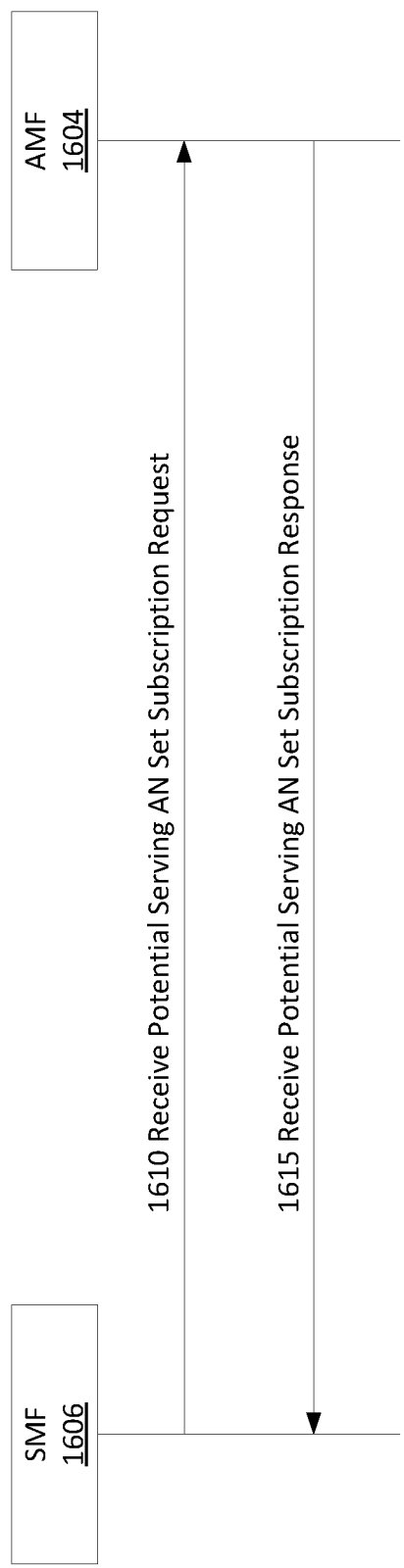
FIG. 15 presents a signaling diagram illustrating an embodiment of session management function and access and mobility management function interaction.

Referring to FIG. 15, a signaling diagram illustrating an embodiment of SMF 1606 and AMF 1604 interaction is provided. In the embodiment, the AMF 1604 is responsible for maintaining the MP for a UE. In step 1610, the SMF 1606 transmits the Receive Potential Serving AN Set Subscription Request to the AMF 1604. The Request may include the UE Identifier (such as Temp UE ID, IMSI, GUTI), a Mobility-awareness Time Window, and the Subscription Type. The Mobility-awareness Time Window can be indicated, for instance by a time period such as the window length. The Subscription Type indicates whether it is a one-time request, or an ongoing request that requires periodic information updates from the AMF 1604.

In step 1615 the AMF 1604 transmits the Receive Potential Serving AN Set Subscription Response to the SMF 1606 that identifies the set of ANs that may potentially serve the UE in the future, based upon the current UE MP. The message may include the Potential Serving AN Set, and a Handover Pre-configuration Indicator. The Potential Serving AN Set includes the identifiers of the set of ANs that will potentially serve the UE within the immediate Mobility-awareness Time Window, based on the current MP of the UE. The Handover Pre-configuration Indicator indicates that the AMF 1604 shall perform handover pre-configuration at the potential serving ANs.

Figure 16:
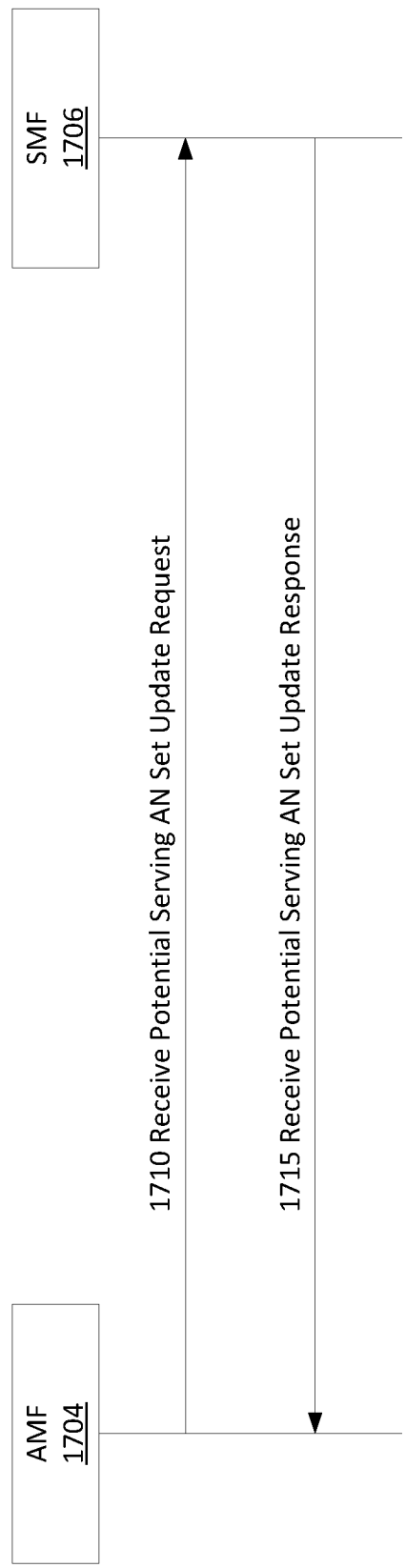
FIG. 16 presents a signaling diagram illustrating an embodiment of session management function and access and mobility management function interaction.

Referring to FIG. 16, a signaling diagram illustrating an embodiment of SMF 1706 and AMF 1704 interaction is provided. In step 1710 the AMF 1704 sends to the SMF 1706 the Receive Serving AN Set Update Request message. The message includes the UE Identifier (such as Temp UE ID, IMSI, GUTI) and the Potential Serving AN Set Update. The Potential Serving AN Set Update indicates the latest entire Potential Serving AN Set or the update part only. The AMF 1704 determines the update according to the respective subscription and the mobility pattern of the UE.

It will be understood that the Potential Serving AN Set Update, in some embodiments, may include only the ANs which have been added and removed (or dropped) from the previous Potential Serving AN set. In further embodiments, there may be different mechanisms to allow the AMF 1604 to provide the SMF 1606 with the most recent Potential Serving AN set. One such embodiment may be an indication sent to the SMF 1606 indicating a location in which a new Potential Serving AN set is located.

In step 1715 the SMF 1706 transmits to the AMF 1704 a Receive Potential Serving AN Set Response that acknowledges reception of the update. The response message may include a Handover Pre-configuration Indicator, which indicates that the AMF 1704 shall perform handover pre-configuration at the potential serving ANs.

Figure 17:
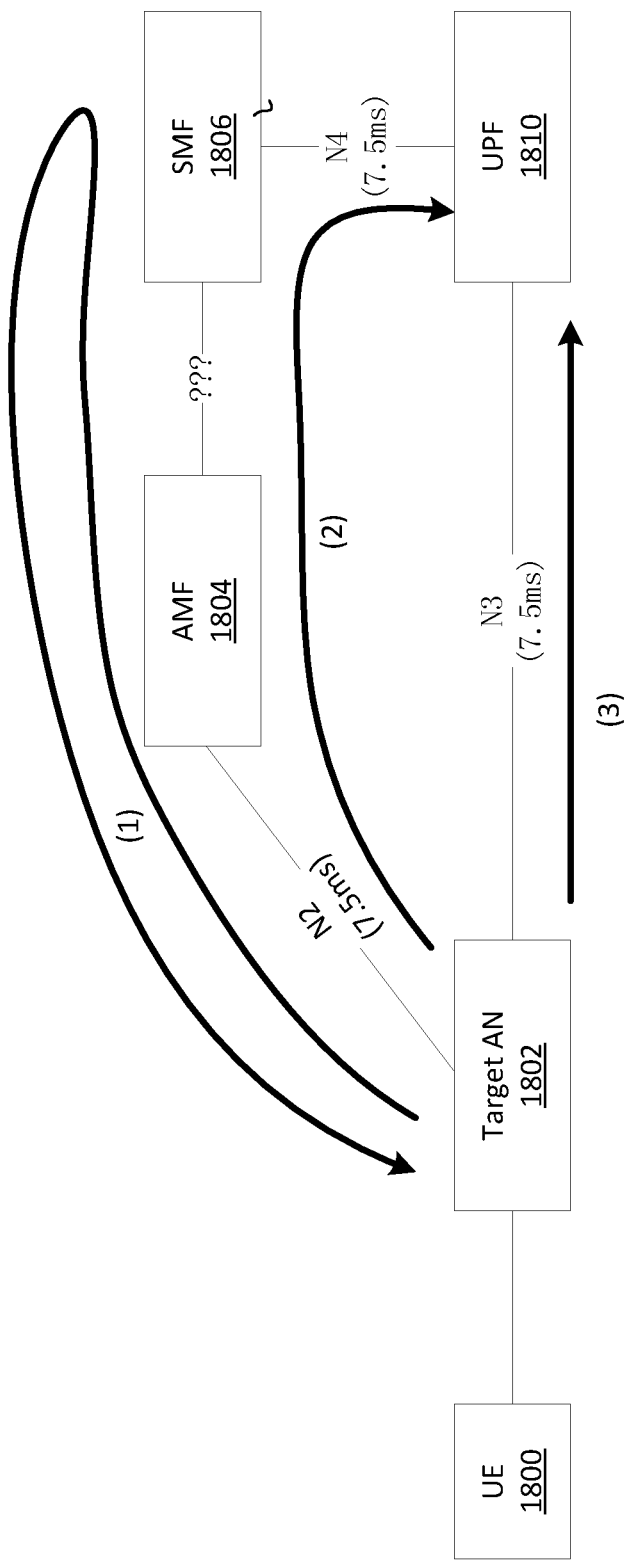
FIG. 17 is a block network diagram illustrating examples of message transfer delay.

Referring to FIG. 17, examples of message transfer delay in handover and path switching are provided in context of an LTE and EPC deployment.

The simplified system includes a UE 1800 in communication with a target RA node AN 1802. The target RA node AN 1802 has an N2 connection to the AMF 1804 and an N3 connection to the UPF 1810. The AMF 1804 has an arbitrary connection to the SMF 1806 with unknown delay, and the UPF 1810 has an N4 connection to the SMF 1806. The specific connections and associated delay indicated in FIG. 17 are intended solely for explanatory purposes, and are not intended to be limiting.

In this example, the S1-C transfer delay is ~2 ms-15 ms and the S1-U transfer delay is 1 ms-15 ms, according to TR 25.912 (Table 13.3). Although the S11 transfer delay is not provided in TR 25.912, it can be generally assumed similar to the S1-C transfer delay, i.e. 2 ms-15 ms. If numbers are comparable in the next generation networks (e.g. 5G networks), even if processing was instantaneous and the AMF-SMF interface had 0 delay, the method disclosed herein could aid in providing at least 15 ms delay reduction in handover (allowing immediate use of the target AN for UL traffic) and possibly at least 7.5 ms delay reduction in path switching (reducing DL traffic forwarding) on average. Note that, if N2 based handover occurs, DL traffic forwarding may contribute ~15 ms delay on average to the end-to-end delay of data packets. Hence, the methods described herein can be implemented to provide an accelerated system response and to reduce traffic forwarding delays.

In a mobility-aware UP path management, the SMF 1806 can subscribe to the information of Serving AN Set, which includes the current serving AN and the other ANs that can potentially serve the UE in the (possibly foreseeable) future, e.g. handover targets. The information about the ANs in the set can be derived from the UE's mobility pattern and provided by a control function such as the AMF 1804 or the PCF (not shown in FIG. 17). According to this information, the SMF 1806 and the AMF 1804 can perform handover pre-configuration. During handover pre-configuration, the potential serving ANs of the UE 1800 can receive the UP related N3 information and the UE context (e.g. security credentials, N2 information, PDU session ID, SSC mode configuration, etc) and other such information such as that normally transferred during handover. The path management procedure applies to intra-AMF handover. It can be deactivated during inter-AMF handover and re-activated afterwards.

Figure 18:
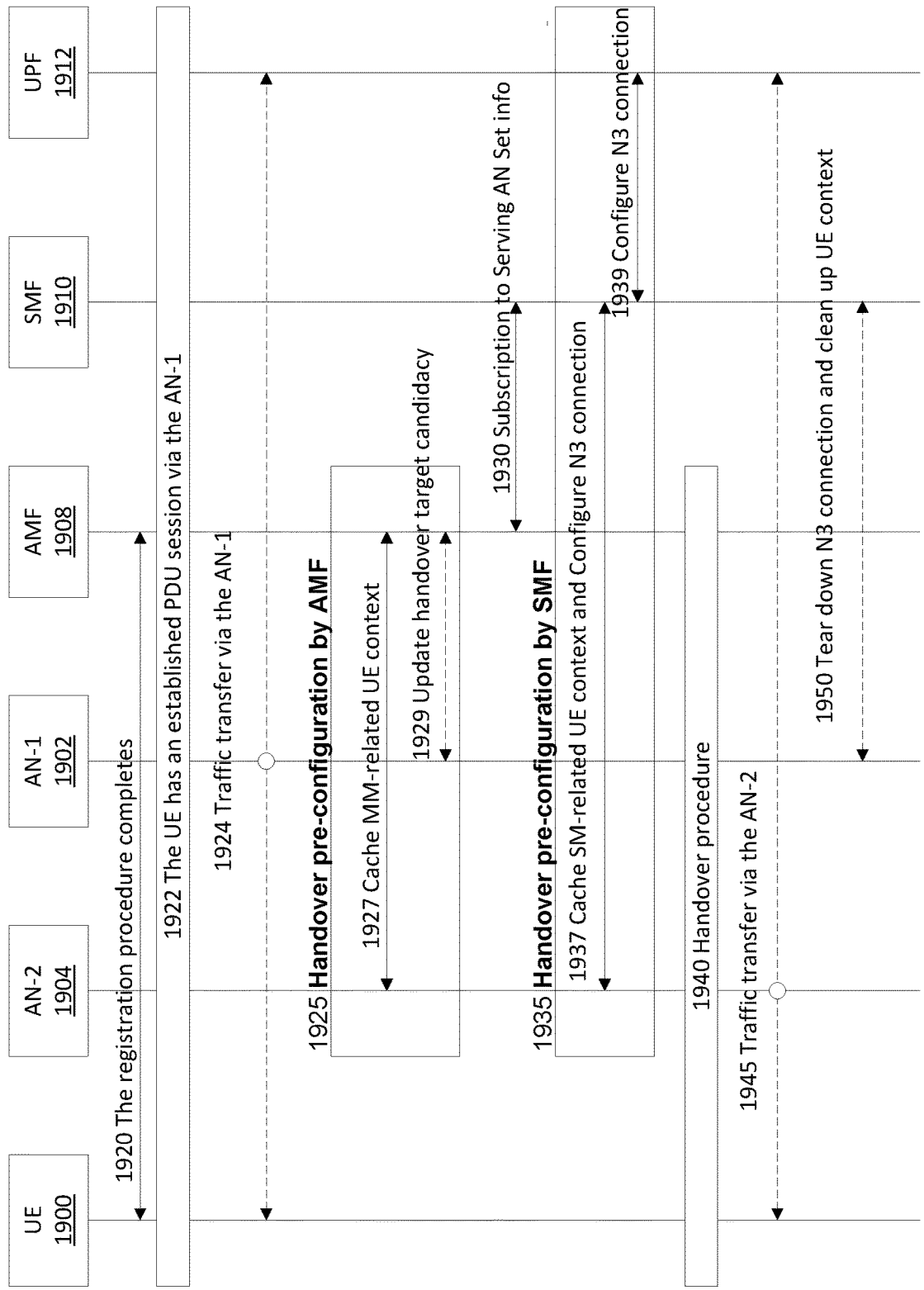
FIG. 18 is a signaling diagram that illustrates an embodiment of mobility-aware UP management

Referring to FIG. 18, a signaling diagram is presented that illustrates an embodiment of mobility-aware UP management. In this embodiment, it is assumed that the registration procedure has completed and that the UE 1900 has an established PDU session via the AN-1 1902. The specific connections indicated in FIG. 18 are by way of example only, and other connections are contemplated.

In step 1920 the registration procedure completes. In step 1922 the UE 1900 establishes a PDU session connected through the AN-1 1902. Traffic may be transmitted in step 1924 from the UE 1900 through AN-1 1902.

According to the operator policy obtained in the step 1920, the AMF 1908 determines when to perform handover pre-configuration at the Potential Serving ANs of the UE 1900. In procedure 1925 the AMF 1908 obtains a set of Potential Serving ANs. In one embodiment, the AMF 1908 obtains the set by determining the Potential Serving ANs according to the UE's mobility pattern and the operator policy. In this exemplary embodiment, it is assumed that the AN-1 1902 is currently serving the UE 1900 and that the AN-2 1904 is a Potential Serving AN. Procedure 1925 is independent from the PDU session establishment in step 1922. The AMF 1908 may continually identify and update the potential serving ANs based on the UE mobility.

Procedure 1925 may, in one embodiment, include messages exchanges 1927 and 1929, and may be referred to as a handover preconfiguration process that is carried out by AMF 1908.

In some aspects, the operator policy may be received from a Policy Control Function (PCF) or a network management component (e.g. a network manager) available on the network. In some aspects, the operator policy is configured by a management plane function or a control plane function. In some aspects, the management plane function may comprise the network manager, a slice manager function, or a service manager function. In some aspects, the control plane function may comprise the PCF.

In step 1927 AMF 1908 informs the AN-2 1904 of the AMF-related UE context information that is normally transferred during handover (e.g. security credentials, N2 information, etc.) for caching. The RAN may exploit the UE context cached at the ANs to simplify RAN handover.

If the AN-2 1904 is a potential handover target for the UE 1900, in step 1929 the AMF 1908 can update AN-1 1902 with the handover target candidacy for the UE 1900.

In step 1930 the SMF transmits, to the AMF, a subscription request to the Serving AN Set information for the UE 1900. In some aspects, the subscription procedure follows the 'Serving AN Set Notification' procedure of the AMF, as currently described in FIG. 20. The Serving AN Set includes the current serving AN and the Potential Serving ANs of the UE 1900. The subscription may indicate whether there is a need for periodic information updates, and if so their periodicity or the conditions under which an update is to be triggered. The subscription request may also indicate whether the AMF 1908 determines the Serving AN Set using its own criteria. This ensures that the Potential Serving ANs in the Serving AN Set are the same as those determined by the AMF 1908 in procedure 1925.

Procedure 1925 and step 1930 are independent of each other in this example embodiment. Steps 1922 and 1930 may be independent of each other in this example embodiment as well.

In procedure 1935 the SMF 1910 performs handover pre-configuration at the Potential Serving ANs of the UE 1900. In step 1937 the SMF 1910 informs the AN-2 1904 of the UP related N3 information for the PDU session and the UE context related to the PDU session (e.g. the PDU session ID, SSC mode configuration, Quality of Service (QoS) rule, etc.). In some aspects, the RAN may exploit the UE context cached at the ANs to simplify RAN handover. In step 1939 the SMF 1910 configures N3 connection at the UP Function (UPF) 1912 so that the UPF 1912 recognizes the binding between the N3 connection and the PDU session for UL traffic. In an aspect, the binding for DL traffic is not configured at step 1939. Procedure 1935 takes place repeatedly as the SMF 1910 identifies new Potential Serving ANs.

In step 1940 the UE 1900 is handed over from the AN-1 1902 to the AN-2 1904 through the handover procedure. In some aspects, the handover procedure corresponds to 'Handover with mobility-aware UP management' as described in FIG. 19.

In step 1945, after handover, traffic may be transferred through AN-2 1904.

In step 1950 the SMF 1912 identifies the ANs that are no longer present in the Serving AN Set of the UE 1900 and requests those ANs to tear down the N3 connection for the PDU session and clean up the UE context. It is assumed, for the purposes of the illustration, that AN-1 1902 is no longer present in the Serving AN Set of the UE 1900.

Figure 19:
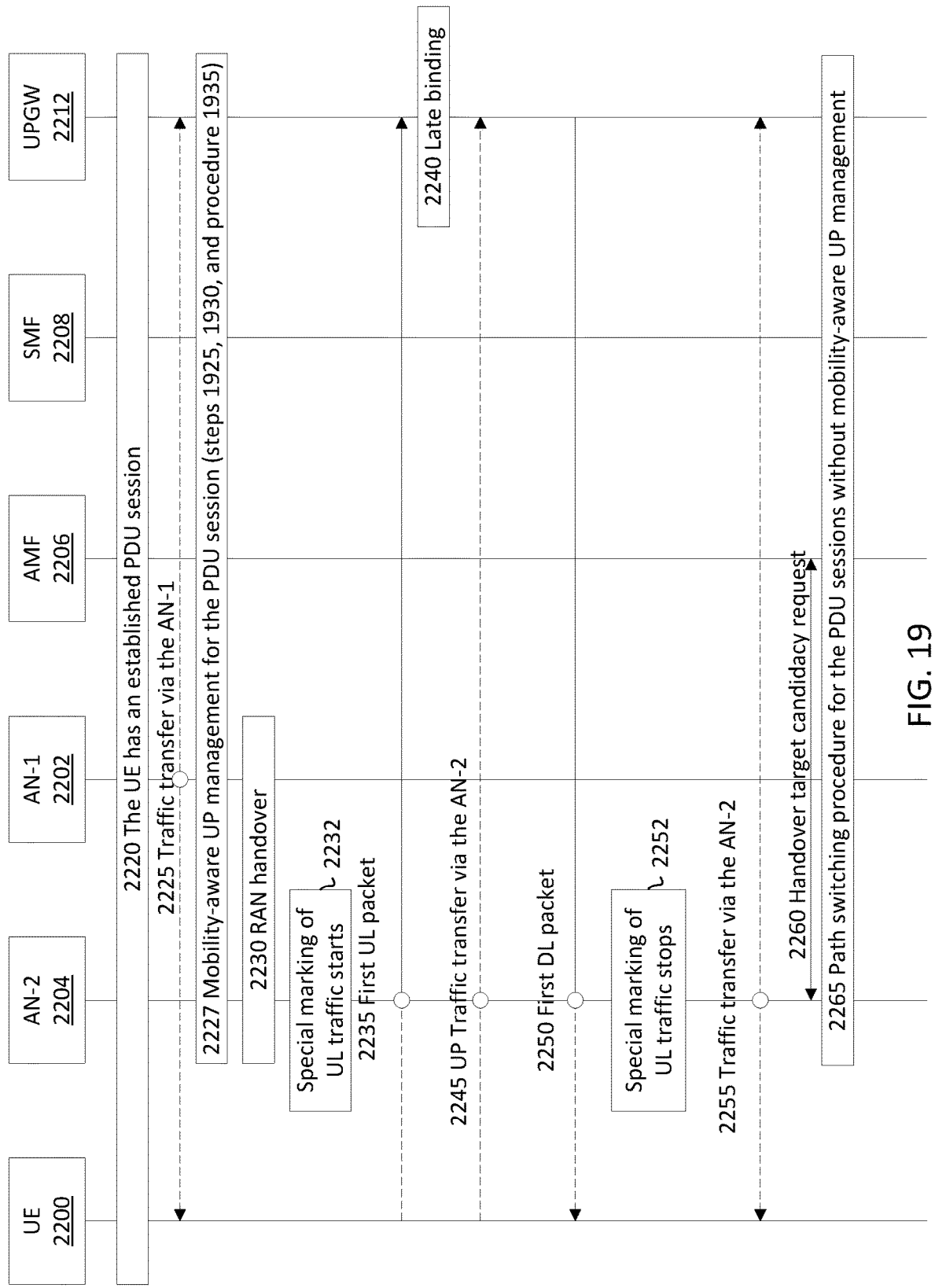
FIG. 19 is a signaling diagram that depicts an embodiment of a handover procedure with mobility-aware UP management

FIG. 19 is a signaling diagram that depicts an embodiment of a handover procedure with mobility-aware UP management. In the embodiment, it is assumed that the UE 2200 has an established PDU session in step 2220, traffic may be transferred through the AN-1 in step 2225, and mobility-ware UP management is performed for the PDU session in step 2227 (i.e. procedure 1925, step 1930, and procedure 1935).

In step 2230 the UE 2200 is handed over to the AN-2 2204 from the AN-1 2202. At the end of RAN handover, in step 2232 the AN-2 2204 starts to apply special marking to UL traffic associated to the PDU session.

In step 2235 the first UL packet associated to the PDU session is sent to a UPF. In the absence of UL traffic, the first UL packet can be a packet generated by the AN-2 2204. In some embodiments, the packet generated by the AN-2 2204 has zero length. Those skilled in the art will appreciate that the UPF 1912 may, in some embodiments, be a UPGW such as UPGW 2212.

In step 2240 the UPF detects the special marking of the UL packet and binds the PDU session to the N3 connection through which the UL packet is received. This late binding is triggered by the detection of the special marking and is necessary for delivery of DL traffic associated to the PDU session to the AN-2 2204. In an aspect, before step 2240 completes, the DL traffic associated to the PDU session is sent to the AN-1 and then forwarded to the AN-2 2204.

In step 2245 UL (uplink) traffic transfer may proceed through the AN-2 2204.

In step 2250 the AN-2 2204 receives the first DL packet associated to the PDU session, which indicates the completion of the late binding. In the absence of DL traffic, the first DL packet can be a DL packet generated by the UPF. In some embodiments, the DL packet generated by the UPF has zero length. Upon the reception of the DL packet, in step 2252 the AN-2 2204 stops special marking of UL traffic for the PDU session. In step 2255 traffic transfer may continue through the AN-2 2204 in both the UL direction and the DL direction. The UPF does not perform later binding for UL packets that do not carry the special marking.

In step 2260 the AN-2 2204 requests information about the candidate handover targets of the UE 2200 from the AMF, which may be the entire Serving AN Set of the UE 2200 or a subset of it. In some aspects, step 2260 may be performed in parallel with the above steps to continue updating candidate handover targets.

Step 2265 indicates that a path switching procedure for PDU sessions without mobility-aware UP management may also take place. In some aspects, step 2265 may be performed in parallel with the above steps to continue path switching for related PDU sessions.

Figure 20:
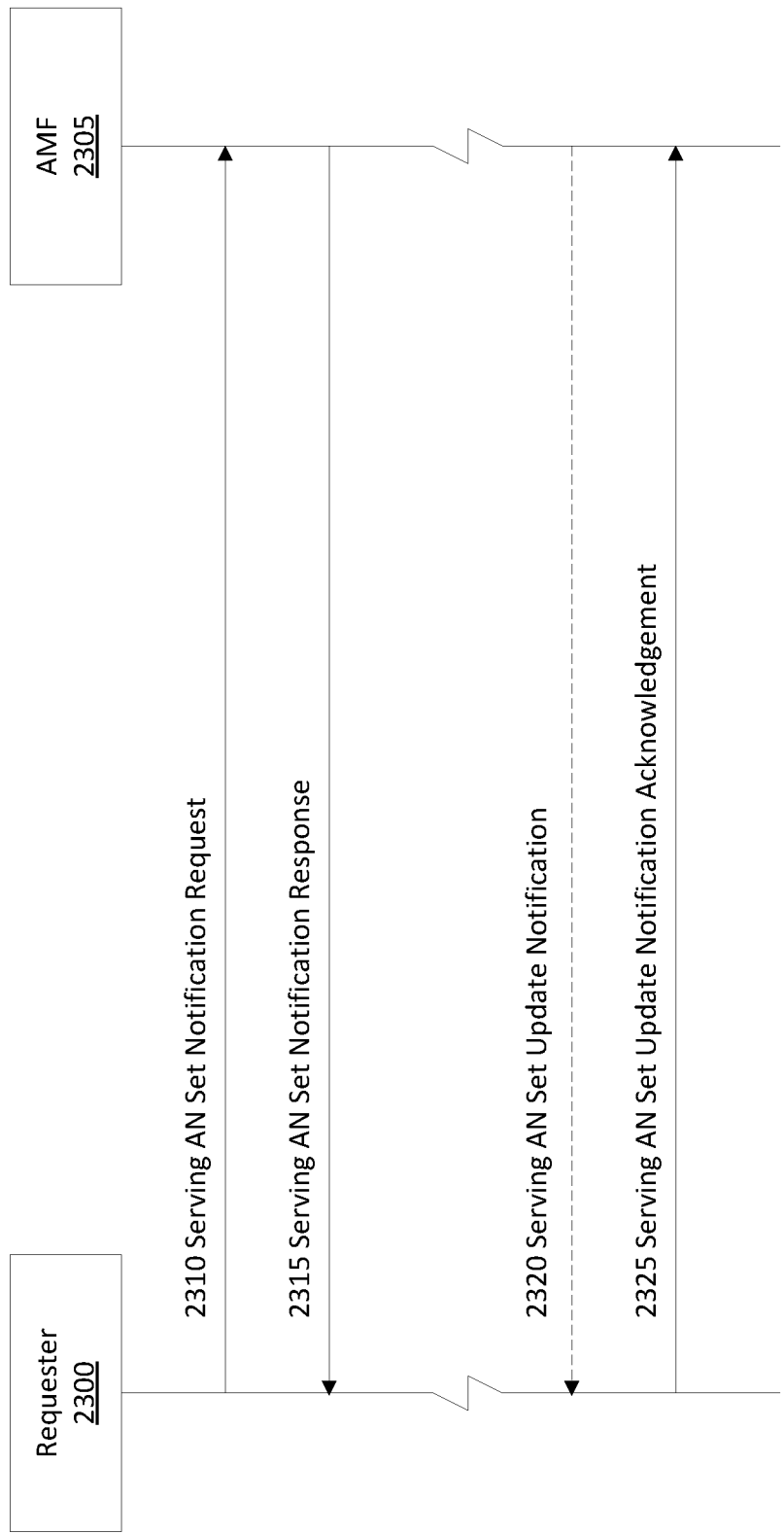
FIG. 20 is a signaling diagram illustrating an embodiment of a Serving AN Set Notification service.

FIG. 20 is a signaling diagram illustrating an embodiment of a Serving AN Set Notification service. The requester Network Function (NF) 2300 subscribes to AN Set information that describes the list of ANs that may potentially server a UE within a given time window.

In step 2310, the requester NF 2300 sends the Serving AN Set Notification Request (Requester NF Identifier, UE Identifier, [Time Window], [Subscription Type]) message to the AMF 2305. The UE Identifier is used to identify the MM context entry in the AMF 2305. The Subscription Type indicates whether this is one-time information retrieval or needs periodic information update. In an aspect, a void of the Time Window field indicates that the AMF 2305 shall determine the Serving AN Set by the AMF's own criteria, which includes AMF-related operator policy. In an aspect, a void of the Subscription Type indicates that the default subscription type shall be used.

In step 2315 the AMF 2305 sends the Serving AN Set Notification Response (Serving AN Set) message to the requester NF 2300. The Serving AN Set includes the identifiers of the AN that is currently serving the UE and the ANs that will potentially serve the UE.

In optional step 2320, the AMF 2305 sends the Serving AN Set Update Notification (Subscription Transaction Identifier, [AMF Identifier,] [UE Identifier,] Serving AN Set Update) message to the requester NF 2300. The Subscription Transaction Identifier is used to identify the subscription context entry in the requester NF 2300. The Serving AN Set Update indicates the latest entire Serving AN Set or the update part only. The AMF Identifier and the UE Identifier are optional fields if the information has already been included in the subscription context in the requester NF. Step 2320 optional if the request in step 2310 is for one-time information retrieval. In dependent step 2325, the requester NF 2300 sends the Serving AN Set Update Notification Acknowledge( ) message to the AMF 2305, indicating receipt of the notification.

Embodiments of the present invention comprise operations automatically provided by one or more nodes and/or functions forming part of a communication network. Each node and/or function may be associated with enabling components such as a microprocessor, electronic memory, and communication interface or interfaces. The microprocessor may execute program instructions stored in memory in order to implement the desired functionality of the node and/or function as described herein. The microprocessor and memory may be at least partially replaced with equivalent electronic components such as digital logic components in some embodiments. Nodes and/or functions may be operated on dedicated hardware or they may be virtualized, that is made to operate on generic hardware platforms in accordance with a network function virtualization (NFV) framework.

In an embodiment, a method is provided for connecting a mobile user equipment (UE) to a network. The method may include a control plane entity available on the network: receiving from an access node a location update for the UE, the location update indicating that the access node is currently serving the UE; and, updating a user plane gateway serving the UE with the location update. In some implementations, the control plane entity comprises a mobile management entity and a session management entity, the session management entity handling the session connecting the UE to the user plane gateway, and wherein the method further comprises: the mobile management entity providing the location update to the session management entity, and wherein the user plane gateway is updated by the session management entity.

In an embodiment, a method is provided for attaching a user equipment (UE) to a network. The method may include an access node: receiving an attach request from the UE; transmitting the attach request to a control plane entity of the network; receiving a resource request from the control plane entity; providing a resource request response to the control plane entity, the resource request response confirming that the requested resources have been allocated; and, transmitting an attach complete response to the UE. In an implementation, the providing the resource request response to the control plane entity comprises the access node transmitting a resource response request to a user plane entity for the user plane entity to transmit a resource request response to the control plane entity on behalf of the access node. In an implementation, the providing the resource request response to the control plane entity comprises the access node transmitting the resource request response to the control plane entity.

In an embodiment, a method is provided for delivering a downlink packet to a user equipment (UE) connected to a network, the method comprising a control plane entity of the network: receiving a UE context request from a user plane gateway (UP-GW) seeking to deliver the downlink packet to the UE; the control plane entity identifies an access network node serving the UE; the control plane entity transmits a UE context request response including an indication of a tunnel serving the identified access network node to the UP-GW, the indication of the tunnel to be used by the UP-GW to deliver the downlink packet to the UE. In an implementation, the indication of the tunnel comprises a tunnel ID value.

In an embodiment, a method is provided for connecting a mobile user equipment (UE) to a network, the method comprising a control plane entity available on the network: receiving from an access node a session request initiated by the UE; determining to apply mobility pattern session management for the session request; obtaining a set of one or more access nodes to be pre-configured to serve the UE; for each of the one or more access nodes, setting up a connection to a user plane corresponding to that access node and the session request; and, sending a session request response to the UE, the session request response including session information for use by the UE to connect to the set of one or more access nodes. In an implementation, the control plane entity comprises a session management function. In an implementation, the method further comprises the control plane entity: receiving an updated set of one or more access nodes available to serve the UE; and, for each of the updated set of one or more access nodes, setting up an updated connection to an updated user plane corresponding to that updated access node. In an implementation, the method further comprises the control plane entity: receiving an updated set of one or more access nodes available to serve the UE; determining that at least one of the set of one or more access nodes are no longer required, based on the updated set of one or more access nodes; and, terminating the user plane and connection corresponding to the at least one of the set of one or more access nodes.

In an embodiment, a method is provided for connecting a mobile user equipment (UE) to a network, the method comprising an access node available on the network: receiving a protocol data unit (PDU) session handover from another access node, the PDU session associated with the UE; transmitting a dummy packet through the PDU session to a user plane gateway (UPGW) available on the network, the dummy packet including an indicator indicating tunnel binding is required for the PDU session; receiving a tunnel binding acknowledgement from the UPGW; transmitting subsequent data packets associated with the PDU session without the indicator. In an implementation, before the tunnel binding acknowledgement is received the method further comprises the access node: receiving, from the UE, data packets associated with the PDU session; adding to each of the data packets the indicator indicating tunnel binding is required for the PDU session; and, transmitting the data packets including the indicator to the UPGW.

In an embodiment, a method is provided for maintaining a connection of a mobile user equipment (UE) to a network, the UE currently connected through a current access node AN, the method comprising a control plane entity available on the network:

determining one or more potential ANs, likely to serve the UE based on at least a mobility pattern of the UE; transmitting to each of the one or more potential ANs, UE context information for use in handing over the connection from the current AN to that potential AN; and, transmitting to the current access node an identity of each of the one or more potential ANs. In an implementation, the determining one or more potential ANs is further based on a network operator policy. In an implementation, the method may further comprise updating the one or more potential ANs based on a current mobility pattern of the UE. In an implementation, the updating is performed continuously or periodically. In an implementation, the method further comprises the control plane entity: receiving from a session management function (SMF) a subscription request to the one or more potential ANs; and, providing to the SMF the identities of the one or more potential ANs. In an implementation, the control plane entity repeatedly provides the identities of the one or more potential ANs to the SMF. In an implementation, the control plane entity determines which of the one or more potential ANs to provide based on the subscription request. In an implementation, the control plane entity determines which of the one or more potential ANs to provide based on pre-determined criteria maintained by the AMF.

In an embodiment, a method is provided for maintaining a connection of a mobile user equipment (UE) to a network, the UE currently connected through a current access node AN, the method comprising a session management function (SMF) available on the network: receiving identities of one or more potential ANs, likely to serve the UE based on at least a mobility pattern of the UE; updating each of the one or more potential ANs with UE context information corresponding to the UE and User Plane related connection information; and, configuring corresponding connections of a UP Function for maintaining the connection through each of the one or more potential ANs. In an implementation, the method further comprises the SMF: receiving updated identities of the one or more potential ANs; and, updating each of the updated one or more potential ANs with UE context information corresponding to the UE and User Plane related connection information; and, configuring corresponding connections of a UP Function for maintaining the connection through each of the updated one or more potential ANs. In an implementation, the method further comprises the SMF: identifying ANs that are no longer identified as being one of the one or more potential ANs; and, instructing the tear down of configured connections corresponding to those ANs. In an implementation, the SMF sends a subscription request to receive the identities of one or more potential ANs. In an implementation, the SMF sends the subscription request on a per PDU session basis. In an implementation, the SMF sends the subscription on a per slice basis. In an implementation, the SMF sends the subscription on a per application basis. In an implementation, the operator policy indicates a time window to be used for determining the one or more potential ANs. In an implementation, the operator policy indicates update criteria for conducting the updating. In an implementation, the operator policy is received from a Policy Control Function (PCF) or a network management component. In an implementation, the operator policy is configured by a management plane function or a control plane function. In an implementation, the operator policy is configured by one of a network manager, a slice manager function, a service manager function, or a Policy Control Function (PCF).

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for maintaining a connection of a mobile user equipment (UE) to a network, the method comprising a core network control plane entity available on the network:
obtaining an indication of a set of potential access nodes that are available to serve the UE during a future time period, the set of potential access nodes based on at least a speed or moving direction of the UE; and,
preconfiguring each of the potential access nodes to accept a handover from the UE to maintain the connection; and
wherein the preconfiguration comprises transmitting UE context for caching by each of the potential access nodes, wherein the UE context comprises a pre-allocated non-access stratum (NAS) message for delivery to the UE.

2. The method of claim 1, wherein the NAS message is delivered to the UE in response to a session request.

3. The method of claim 1, wherein the NAS message is delivered to the UE on handover.

4. The method of claim 1, wherein the control plane entity comprises a session management function (SMF) or an access and mobility management function (AMF) that maintains the mobility pattern of the UE.

5. A network function of a core network, the network function comprising:
a network interface for receiving data from and transmitting data to network functions connected to a network;
a processor; and
a non-transient memory for storing instructions for maintaining a connection of a mobile user equipment (UE) to the network that when executed by the processor cause the network function to be configured to:
obtain an indication of a set of potential access nodes that are available to serve the UE during a future time period, based on at least a speed or moving direction of the UE; and,
preconfigure each of the potential access nodes to accept a handover from the UE to maintain the connection; and
wherein the preconfiguration comprises transmitting UE context for caching by each of the potential access nodes, wherein the UE context comprises a pre-allocated non-access stratum (NAS) message for delivery to the UE.

6. The network function of claim 5, wherein the network function is further operative to deliver the NAS message to the UE in response to a session request.

7. The network function of claim 5, wherein the network function is further operative to deliver the NAS message to the UE on handover.

8. The network function of claim 5, wherein the network function comprises a session management function (SMF) or an access and mobility management function (AMF) that maintains the mobility pattern of the UE.

* * * * *